US010493910B2

(12) United States Patent
Boyle

(10) Patent No.: US 10,493,910 B2
(45) Date of Patent: Dec. 3, 2019

(54) UNMANNED ROADSIDE SIGNAGE VEHICLE SYSTEM

(71) Applicant: Norman Boyle, Tura Beach (AU)

(72) Inventor: Norman Boyle, Tura Beach (AU)

( * ) Notice: Subject to any disclaimer, the term of this patent is extended or adjusted under 35 U.S.C. 154(b) by 0 days.

(21) Appl. No.: 15/775,181

(22) PCT Filed: Nov. 11, 2016

(86) PCT No.: PCT/AU2016/051084
§ 371 (c)(1),
(2) Date: May 10, 2018

(87) PCT Pub. No.: WO2017/079803
PCT Pub. Date: May 18, 2017

(65) Prior Publication Data
US 2018/0326901 A1    Nov. 15, 2018

(30) Foreign Application Priority Data

Nov. 12, 2015    (AU) ................................ 2015904662
Dec. 22, 2015    (AU) ................................ 2015905331

(51) Int. Cl.
*B60Q 7/00*      (2006.01)
*E01F 9/662*      (2016.01)
(Continued)

(52) U.S. Cl.
CPC ............... *B60Q 7/00* (2013.01); *B60Q 1/503* (2013.01); *E01F 9/662* (2016.02); *G05D 1/0246* (2013.01);
(Continued)

(58) Field of Classification Search
CPC .......... B60Q 7/00; B60Q 1/503; E01F 9/662; G05D 1/0246; G05D 1/0295;
(Continued)

(56) References Cited

U.S. PATENT DOCUMENTS 7,007,420 B2 *    3/2006    Garcia ..................... G09F 7/22
                                                              116/63 P
9,607,510 B1 *    3/2017    DeLorean .......... G06Q 30/0241
(Continued)

FOREIGN PATENT DOCUMENTS

CH             686048       12/1995
DE          2627340 A1    12/1977
(Continued)

OTHER PUBLICATIONS

International Search Report & Written Opinion dated Feb. 13, 2017 from PCT Application No. PCT/AU2016/051084.

*Primary Examiner* — Quang Pham
(74) *Attorney, Agent, or Firm* — Innovation Capital Law Group, LLP; Vic Lin

(57) ABSTRACT

There is provided an unmanned roadside signage vehicle comprising an autonomous, semiautonomous and/or remotely controllable roadside signage vehicle for various roadside signage, emergency response and maintenance applications. In accordance with one aspect, the unmanned roadside signage vehicle comprises drive motors operably coupled to driven wheels; steering coupled to the driven wheels; a controller for controlling the drive motors and steering; at least one electronic signage board for displaying roadside signage; and a data interface for receiving at least remote control instructions, the data interface operably coupled to the controller and wherein the controller is configured for controlling the drive motors and steering in accordance with the remote control instructions.

13 Claims, 16 Drawing Sheets

(51) Int. Cl.
*B60Q 1/50* (2006.01)
*G05D 1/02* (2006.01)
*G08G 1/0955* (2006.01)

(52) U.S. Cl.
CPC ......... *G05D 1/0295* (2013.01); *G08G 1/0955* (2013.01); *G05D 2201/0202* (2013.01); *G05D 2201/0213* (2013.01)

(58) Field of Classification Search
CPC ... G05D 2201/0202; G05D 2201/0213; G08G 1/0955
See application file for complete search history.

(56) References Cited

U.S. PATENT DOCUMENTS

| | | | | | |
|---|---|---|---|---|---|
| 2006/0229804 | A1* | 10/2006 | Schmidt | ............... | G05D 1/0278 701/466 |
| 2009/0255887 | A1* | 10/2009 | Mrowiec | ................... | E01F 9/70 211/85.8 |
| 2012/0303458 | A1* | 11/2012 | Schuler, Jr. | ........... | G09F 27/005 705/14.63 |
| 2013/0270394 | A1* | 10/2013 | Downs | ................. | G05D 1/0027 244/76 R |
| 2014/0070963 | A1* | 3/2014 | DeLorean | ......... | G06Q 30/0241 340/917 |
| 2014/0343891 | A1* | 11/2014 | Becker | .................. | G07F 17/246 702/150 |
| 2015/0043231 | A1* | 2/2015 | Clark | .................... | G09F 21/048 362/485 |
| 2016/0071418 | A1* | 3/2016 | Oshida | ..................... | G08G 1/22 701/23 |
| 2016/0129999 | A1* | 5/2016 | Mays | .................... | B64C 39/024 701/2 |
| 2017/0160748 | A1* | 6/2017 | Nakagawaa | ........... | A01B 69/00 |
| 2017/0177003 | A1* | 6/2017 | Yokoyama | ........... | G05D 1/0295 |
| 2018/0247137 | A1* | 8/2018 | Boyle | .................... | G06Q 10/10 |

FOREIGN PATENT DOCUMENTS

| | | | | |
|---|---|---|---|---|
| DE | 3709662 | A1 | | 10/1988 |
| DE | 19722292 | A1 * | 12/1998 | ........... G08G 1/0955 |
| DE | 19722292 | A1 | | 12/1998 |
| DE | 102013104990 | A1 | | 11/2014 |
| WO | 2015089588 | A1 | | 6/2015 |

* cited by examiner

UNMANNED ROADSIDE SIGNAGE VEHICLE SYSTEM

FIELD OF THE INVENTION

The present invention relates generally to roadside maintenance machinery signage and in particular, but not necessarily entirely, to an unmanned roadside vehicle system for roadside signage and/or maintenance.

BACKGROUND

Safety signage may, for example, be utilised for the purposes of warning motorists of roadside grass cutting machinery.

In this regard, according to conventional arrangements, a maintenance plan may be formulated for a grass cutting job, taking into account various roadside factors including motorists speed.

Signage is then deployed in accordance with the maintenance plan when grass cutting. Such usually involves the placement of static roadside signs warning motorists of the grass cutting machinery ahead, regulating speed and the like.

Placement of roadside signs has problems in that the roadside signage remain stationary while the grass cutter is moving. As such, it is not atypical for roadside signage to be kilometers away from the grass cutting machinery. Usually grass cutter operators place signage, cut along one verge of the road and then cross over the road to return along the opposite verge, retrieving signage along the way.

To avoid the problems of stationery signage, marshalling vehicles may be employed, such as utility vehicles leading and following the grass cutting machinery, the utility vehicles comprising appropriate signage. A problem with this approach however is the expense in running these marshalling vehicles, not only fuel equipment cost, but also man-hours.

Furthermore, deployment of roadside signage has inherent safety risks wherein those deploying roadside signage are exposed to risk of being run over by passing vehicles or affected by other roadside hazards such as downed electrical power lines and the like.

It is to be understood that, if any prior art information is referred to herein, such reference does not constitute an admission that the information forms part of the common general knowledge in the art, in Australia or any other country.

SUMMARY

According to one aspect, there is provided a system for autonomous beyond line-of-sight roadside maintenance machinery signage, the system comprising a maintenance machine comprising a maintenance machine location sensor configured for determining a location of the maintenance machine; at least one autonomous unmanned vehicle comprising drive motors operably coupled to driven wheels; steering coupled to the driven wheels; unmanned vehicle location sensor configured for determining a location of the autonomous unmanned vehicle; a vision sensor subsystem for determining at least a lateral offset of the autonomous unmanned vehicle with respect to a road verge wherein, in use, the system may be configured for: receiving unmanned vehicle formation configuration settings for controlling the formation deployment of the unmanned vehicle with respect to the maintenance machine, the formation configuration settings comprising at least one of a route offset configuration setting representing a distance between the unmanned vehicle and the maintenance machine in use; and a road verge lateral offset configuration setting representing an offset distance of the unmanned vehicle from a road verge in use; receiving maintenance machine location data from the maintenance machine location sensor representing a location of the maintenance machine; receiving unmanned vehicle location data from the unmanned vehicle location sensor representing a location of the unmanned vehicle; controlling the motors of the unmanned vehicle in accordance with the route offset configuration setting, maintenance machine location data and unmanned vehicle location data; receiving realtime road verge lateral offset data from the vision sensor subsystem representing an realtime road verge lateral offset of the unmanned vehicle from the road verge; and controlling the steering in accordance with the realtime road verge lateral offset data and the road verge lateral offset configuration setting.

The system may be configured for controlling the motors of the unmanned vehicle further in accordance with an actual route.

The unmanned vehicle route offset configuration setting may be a leading route offset configuration setting such that the unmanned vehicle may be configured for leading the maintenance machine and wherein the actual route may be a predetermined route.

The predetermined route may be obtained from a historical maintenance route.

The unmanned vehicle route offset configuration setting may be a following route offset configuration setting such that the unmanned vehicle may be configured for following the maintenance machine and wherein the actual route may be a waypoint route of the maintenance machine.

The system may be configured for creating the waypoint route of the maintenance machine in accordance with periodic location data received from the maintenance machine location sensor.

The system may be configured for controlling the steering of the unmanned vehicle further in accordance with an actual route.

The unmanned vehicle route offset configuration setting may be a following route offset configuration setting such that the unmanned vehicle may be configured for following the maintenance machine and wherein the actual route may be a waypoint route of the maintenance machine.

The system may be configured for generating an interpolated unmanned vehicle route in accordance with the waypoint route.

Generating the interpolated unmanned vehicle route may comprise identifying portions of the waypoint route where the maintenance machine reverses to avoid an obstacle.

The vision sensor subsystem may be configured for determining the actual lateral offset of the autonomous unmanned vehicle with respect to a road verge using image recognition.

The image recognition may be configured for recognising at least one of a verge line, centre line, and roadside barrier.

The vision sensor subsystem may be configured for interpolating between broken sections of the centre line.

The road verge lateral offset configuration setting may comprise at least one of an on-road and off-road setting and an offset distance.

The unmanned vehicle further may comprise object avoidance capabilities.

The object avoidance capabilities may comprise the image subsystem using image recognition.

The image recognition may comprise recognising known roadside furniture.

The object avoidance capabilities may comprise the unmanned vehicle comprising an object detector.

The object detector may comprise an object proximity sensor.

The object proximity sensor may comprise at least one of an ultrasonic and Lidar sensor.

The object detector may comprise a bump sensor.

The system may be configured for selecting the unmanned vehicle formation configuration settings in accordance with a maintenance plan selection.

The maintenance machine may comprise a GUI configured for selecting the maintenance plan selection.

The maintenance machine may comprise a GUI configured for configuration the unmanned vehicle formation configuration settings.

The unmanned vehicle further may comprise dynamic signage.

The system may be configured for controlling the dynamic signage.

The maintenance machine may comprise a GUI configured for controlling the dynamic signage.

The GUI may comprise a sign selection control.

The GUI may comprise a selected sign configuration control.

The system may be configured for automating updates of the dynamic signage.

The system may be configured for updating the dynamic signage in accordance with a maintenance mode of operation of the maintenance machine.

The maintenance mode of operation of the maintenance machine may comprise at least one of stationery, travelling and operating.

The system may be configured for updating the dynamic signage in accordance with a route offset distance representing the distance between the unmanned vehicle and the maintenance machine.

The unmanned vehicle may comprise stop/go signage and wherein the system may be configured for implementing single lane alternate traffic flow control using the stop/go signage of the unmanned vehicle and another unmanned vehicle.

The unmanned vehicle may comprise a passing car counter and wherein the system may be further configured for controlling traffic flow in accordance with count data received from the passing car counter.

The system may be configured for driving the drive motors when the stop/go signage displays go signage.

The system may be configured for halting the drive motors when the stop/go signage displays stop signage.

According to another aspect, there is provided an unmanned vehicle for roadside maintenance machinery fire management, the unmanned vehicle comprising: a fire suppressant tank for storing fire suppressant; at least one jet fluidly coupled to the tank for dispensing the suppressant; a network interface for receiving control instructions data from a proximate maintenance machine and wherein, in use, the unmanned vehicle may be configured for: receiving fire suppressant instructions from the maintenance machine and spraying fire suppressant from the least one jet accordingly.

The unmanned vehicle further may comprise a fire detection subsystem configured for detection of a proximate fire.

The fire detection subsystem may be further configured for detection a direction of the fire.

The fire detection subsystem may be further configured for detection a distance of the fire.

The fire detection subsystem may be configured for sending a fire detection alert to the maintenance machine via the network interface.

The unmanned vehicle may be further configured to automate the spraying of fire suppressant in accordance with the fire detection subsystem detecting the fire.

The unmanned vehicle may be further configured to follow the fire.

The fire detection subsystem may comprise a thermometer for sensing heat from the fire.

The fire detection subsystem may comprise an IR sensor.

The unmanned vehicle may further comprise a vision sensor subsystem comprising a visible imaging camera and wherein, in use, the vision sensor subsystem may be configured for sending visible imaging data via the network interface to the maintenance machine.

The vision sensor subsystem further may comprise a thermal imaging camera and wherein, in use, the vision sensor subsystem may be configured for sending thermal imaging data via the network interface to the maintenance machine.

The at least one jet may be configured for providing a protective veil of the fire suppressant for protecting the unmanned vehicle from fire.

According to another aspect, there is provided an unmanned roadside signage vehicle comprising drive motors operably coupled to driven wheels; steering coupled to the driven wheels; a controller for controlling the drive motors and steering; at least one electronic signage board for displaying roadside signage; a data interface for receiving at least remote control instructions, the data interface operably coupled to the controller and wherein the controller is configured for controlling the drive motors and steering in accordance with the remote control instructions.

The controller may be further configured for controlling the electronic signage in accordance with the remote control instructions.

The unmanned roadside signage vehicle may further comprise a memory device comprising roadside signage data representing a plurality of roadside signs and wherein the remote control instructions may comprise a selection of one of the plurality of roadside signs and wherein the controller may be configured for controlling the electronic signage board to display the one of the plurality of roadside signs.

The vehicle may comprise a low profile vehicular body and wherein the at least one electronic signage board may comprise a rearwardly facing electronic signage board attached at a rearward position to the vehicular body and vertically orientated.

The rearwardly facing electronic signage board may comprise a width being substantially the same or greater than that of the width of the vehicular body.

The rearwardly facing electronic signage board may comprise a height greater than the width of the electronic signage board.

The at least one electronic signage board further may comprise a forward facing electronic signage board.

The forward facing electronic signage board may be smaller than the rearward facing electronic signage board.

The at least one electronic signage board may be configurable in a deployed configuration wherein the at least one electronic signage board may be vertically poised for displaying roadside signage and a stowed configuration.

The at least one electronic signage board may be detachable from the vehicular body.

The at least one electronic signage board may be pivotally coupled to the vehicular body so as to lie across an upper surface of the vehicular body when in the stowed configuration.

The low profile vehicular body may comprise a substantially horizontal upper surface transitioning rearwardly to an upwardly extending aspect.

The at least one electronic signage board may be fastened to the rearward upwardly extending aspect.

The vehicle further may comprise a solar panel fastened to the substantially horizontal upper surface of the vehicular body.

The unmanned roadside signage vehicle may further comprise indicator lights and wherein the controller may be configured for controlling the indicator lights.

The controller may be configured for controlling the indicator lights in accordance with manoeuvres represented by the remote control instructions.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
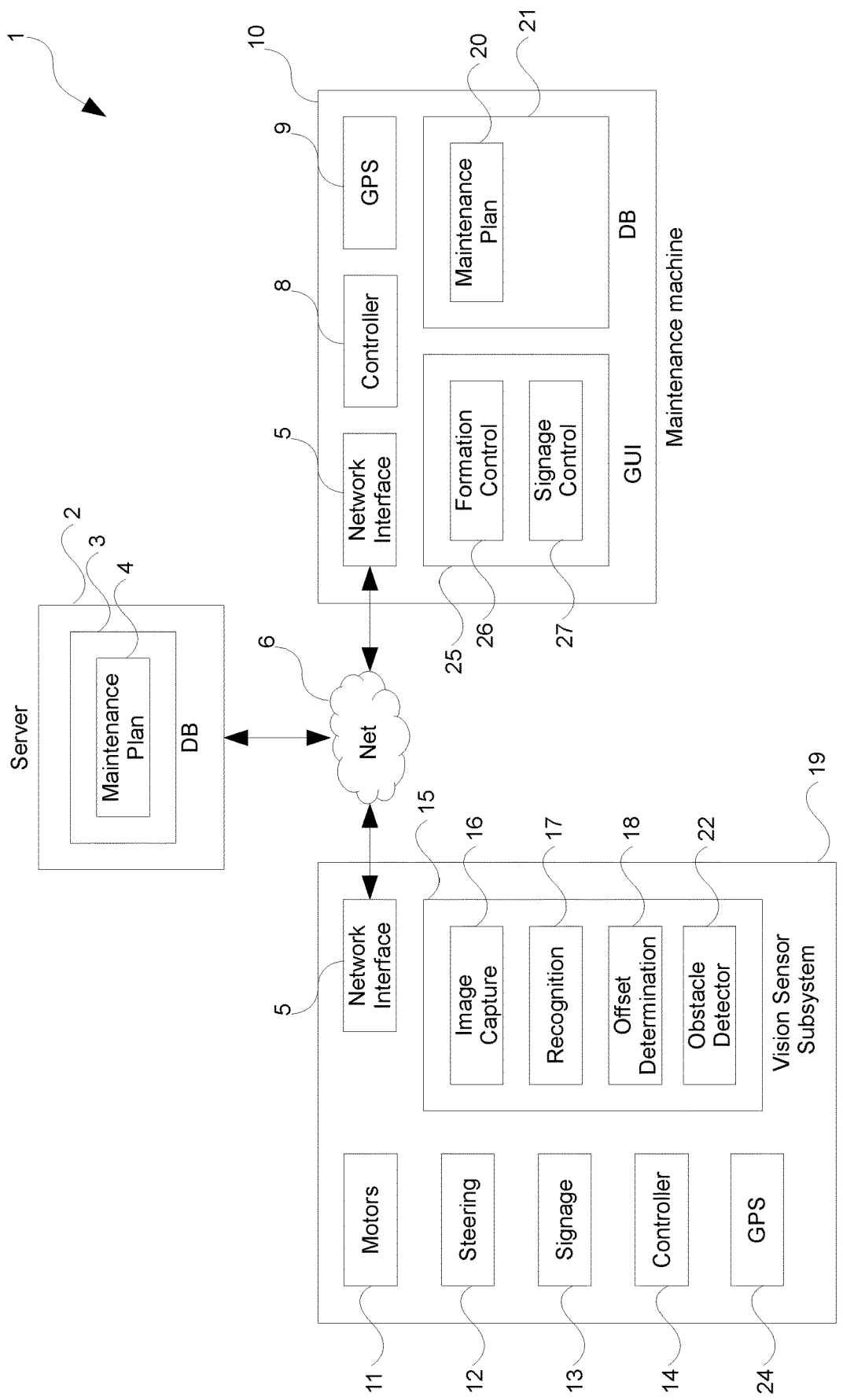
FIG. 1 shows a system for autonomous beyond line-of-sight roadside maintenance machinery signage in accordance with an embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

Before the structures, systems and associated methods relating to the unmanned roadside signage vehicle system are disclosed and described, it is to be understood that this disclosure is not limited to the particular configurations, process steps, and materials disclosed herein as such may vary somewhat. It is also to be understood that the terminology employed herein is used for the purpose of describing particular embodiments only and is not intended to be limiting since the scope of the disclosure will be limited only by the claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterised by," and grammatical equivalents thereof are inclusive or open-ended terms that do not exclude additional, unrecited elements or method steps.

It should be noted in the following description that like or the same reference numerals in different embodiments denote the same or similar features.

Unmanned Roadside Vehicle System

In the ensuing description, there will be provided various embodiments including an embodiment wherein the system comprises autonomous or semiautonomous unmanned roadside signage vehicles for autonomous or semiautonomous beyond line-of-sight roadside maintenance machinery signage. A further embodiment comprises an autonomous, semiautonomous or remote control unmanned roadside vehicle for fire suppression. A further embodiment comprises a remote control unmanned roadside vehicle. Other aspects are also disclosed.

A System 1 for Autonomous Beyond Line-of-Sight Roadside Maintenance Machinery Signage Turning now to FIG. 1, there is shown a system 1 for autonomous beyond line-of-sight roadside maintenance machinery signage wherein, generally, the system 1 utilises at least one autonomous unmanned vehicle configured to lead or to follow roadside maintenance machinery so as to warn motorists of the maintenance machinery.

It should be noted that the term "autonomous" should not be construed literally herein in that the unmanned vehicle is entirely autonomous wherein, certain operational aspects of the unmanned vehicle may be human controlled including by remote control such that the unmanned vehicle is semi-autonomous also.

Now, as can be seen, the system 1 comprises a maintenance machine 10. In the embodiments described herein, the maintenance machine 10 will be described with reference to the preferred embodiment wherein the maintenance machine 10 is grass cutting machine.

Figure 2:
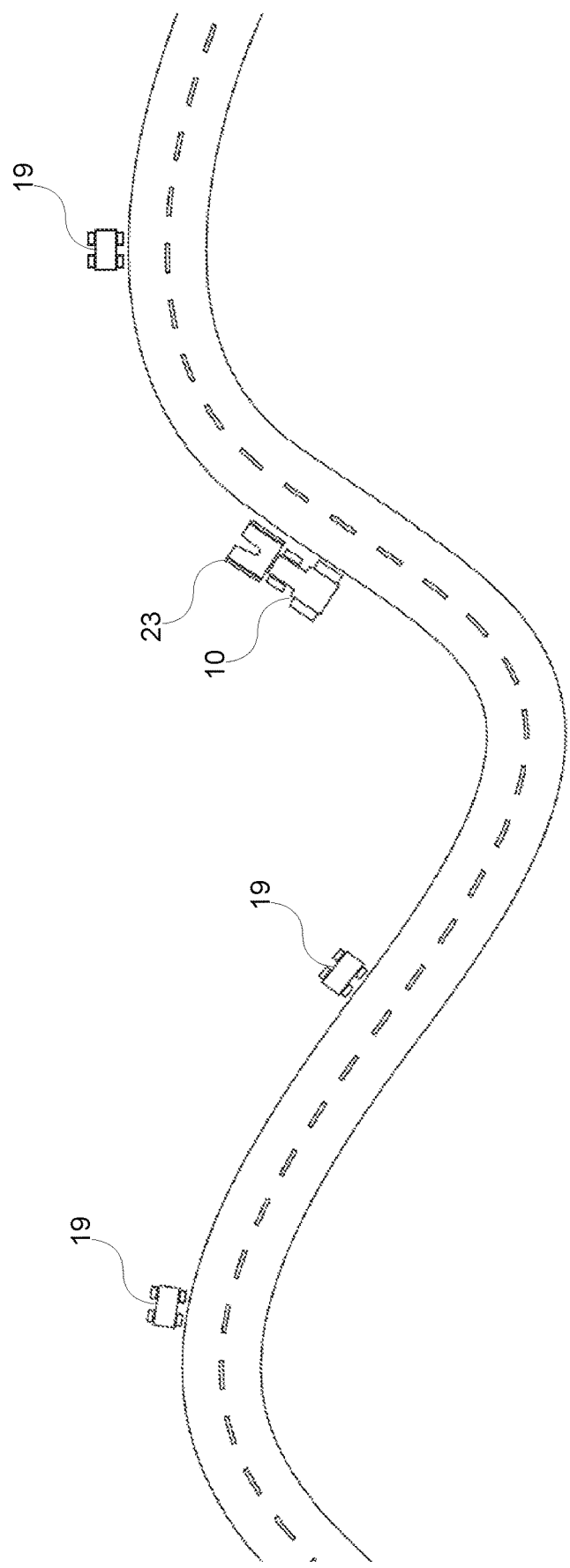
FIGS. 2-10 show exemplary maintenance machinery and unmanned vehicle formations implemented by the system of FIG. 1 in accordance with embodiment of the present disclosure.
Figure 3:
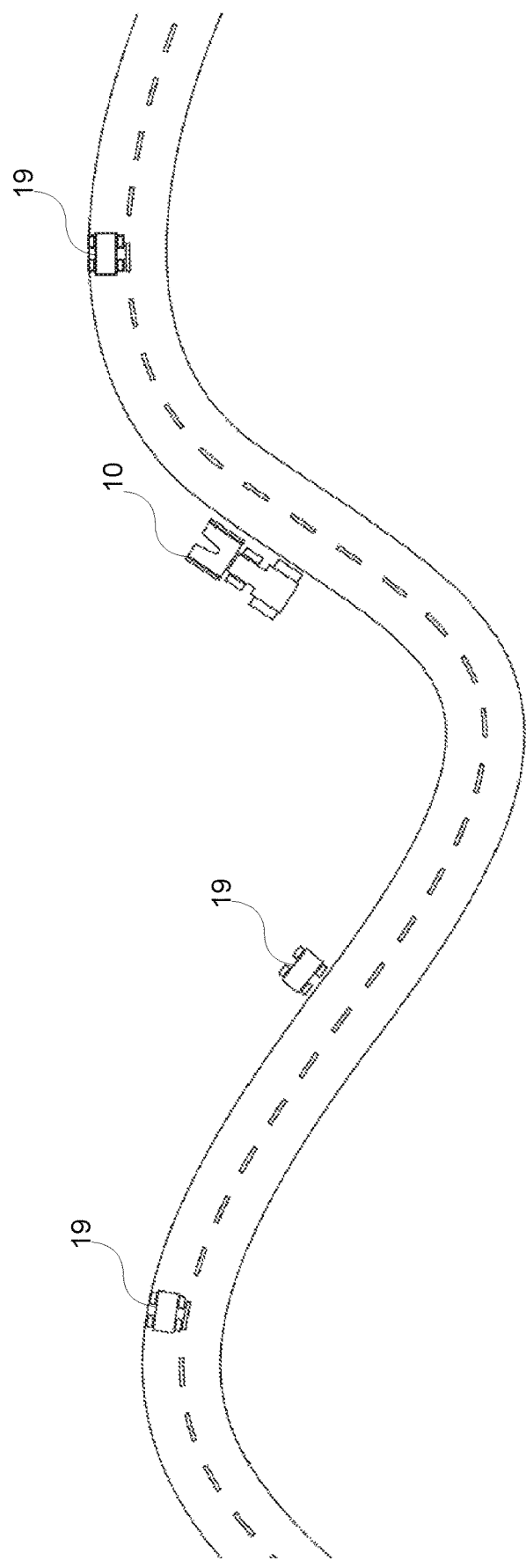

Specifically, referring to FIG. 2, there is shown an exemplary roadside formation comprising the maintenance machine 10 comprising a forward located grass cutter 23, the subject of which is described in publication in WO2015089588 entitled "A Vegetation Cutter", the entire contents of which is incorporated herein by reference.

However, it should be appreciated that the maintenance machinery 10 may be any type of roadside maintenance machinery falling within the purposive scope of the embodiments described herein.

As can be seen from FIG. 1, the maintenance machine 10 comprises a location sensor 9 configured for determining the location of the maintenance machine 10. In the embodiments described herein, the location sensor is a GPS receiver 9.

Unmanned Vehicle 19

The system 1 further comprises the autonomous unmanned vehicle 19. As alluded to above, the autonomous unmanned vehicle 19 comprises signage 13 and is configured for leading or following the maintenance machine 10 so as to warn motorists appropriately.

In a preferred embodiment, the unmanned vehicle 19 is a wheeled unmanned vehicle. In this manner, the unmanned vehicle 19 comprises drive motors 11 operably coupled to driven wheels. Furthermore, the unmanned vehicle 19 comprises steering 12 operably coupled to the driven wheels. In this manner, the unmanned vehicle 19 is able to drive and steer.

Figure 11:
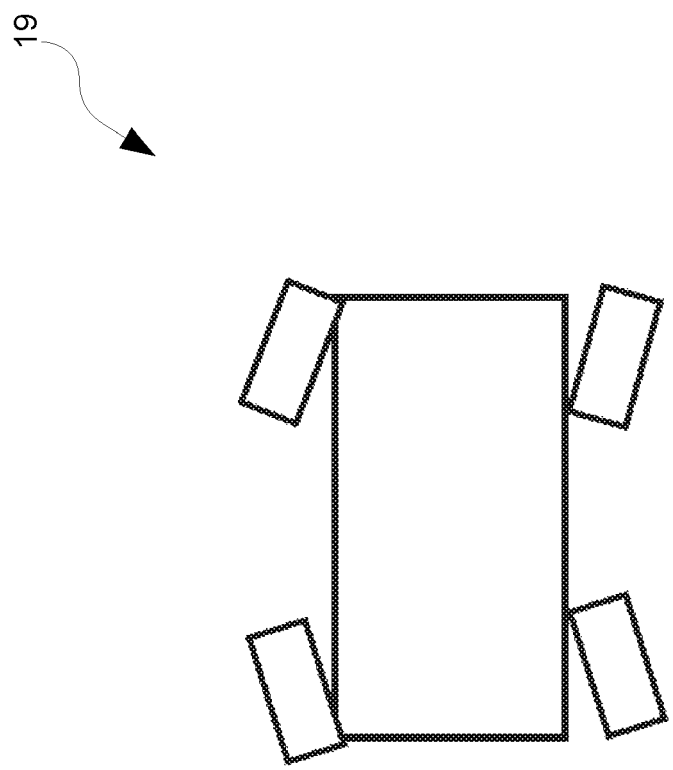
FIG. 11 shows the steering of the unmanned vehicle of FIG. 1 in further detail in accordance with an embodiment of the present disclosure.

In the embodiment shown in FIG. 11, the steering 12 may be able to control both the forward and rearward wheels of the unmanned vehicle 19.

In a preferred embodiment, the unmanned vehicle is a battery-powered device such that the drive motors 11 are electric. Furthermore, the wheels may be all-terrain pneumatic tires configured for allowing the negotiation of roadside terrain.

Furthermore, the autonomous unmanned vehicle 19 may be provided with a low centre of gravity, such as by locating the rechargeable batteries (which may be lithium or heavier lead acid type batteries) towards the bottom of the autonomous unmanned vehicle 19 so as to lower the centre of gravity of the unmanned vehicle 19. In this manner, the unmanned vehicle 19 may withstand windshear forces, especially from passing vehicles.

Furthermore, the autonomous unmanned vehicle 19 may be configured for motorists safety in the event of a vehicle collision. In this manner, the unmanned vehicle 19 may be low profile such that, in the event of a collision, the majority of the autonomous unmanned vehicle 19 would be subsumed beneath the vehicle. Furthermore, the autonomous unmanned vehicle 19 may be devoid of any heavy componentry located at height so as to prevent potential windscreen penetration during a collision.

As can be seen from FIG. 1, the unmanned vehicle 19 further comprises an unmanned vehicle location sensor 24, similarly configured for determining the location of the unmanned vehicle 19. Again, the location sensor 24 may comprise a GPS receiver.

Unmanned Vehicle Formation Configuration Settings

Now, in use, the system 1 is configured for receiving unmanned vehicle formation configuration settings for controlling the formation deployment of the unmanned vehicle 19 with respect to the maintenance machine 10. In a preferred embodiment, the formation configuration settings may comprise at least one of a route offset configuration setting representing a distance between the unmanned vehicle 19 and the maintenance machine 10 in use and a road verge lateral offset configuration setting representing an offset distance of the unmanned vehicle 19 from a road verge in use.

As such, in this manner, the unmanned vehicle 19 may be configured to lead or to follow the maintenance machine 10 at a particular distance, referred to herein as the route offset for convenience.

Furthermore, the lateral offset of the unmanned vehicle 19 with respect to the road verge is also configurable so as to control the lateral offset of the unmanned vehicle 19. For example, it may be required that the unmanned vehicle 19 travel either on or off the road, road shoulder and the like. Furthermore, as is apparent from the embodiments described herein, in embodiments and plurality of unmanned vehicles 19 may be deployed. In this manner, the most rearward unmanned vehicle 19 may travel off-road and comprising speed limitation signage so as to be suited for high-speed vehicles whereas the more forward located unmanned vehicles 19 may be configured to travel on-road.

Now, the system 1 is further configured for receiving maintenance machine location data from the maintenance machine location sensor 9 representing a location of the maintenance machine 10. In this way, the system 1 is configured for ascertaining the location of the maintenance machine 10.

Furthermore, the system 1 is configured for receiving unmanned vehicle location data from the unmanned vehicle location sensor 24 representing a location of the unmanned vehicle 19. In this manner, the system 1 is similarly configured for determining a location of the unmanned vehicle 19.

Now, having the location of both the maintenance machine 10 and the autonomous unmanned vehicle 19 the system 1 is configured for controlling the motors 11 of the unmanned vehicle in accordance with the route offset configuration setting, maintenance machine location data and unmanned vehicle location data.

For example, the unmanned vehicle 19 may be configured, by the configuration settings, to travel 500 m behind the maintenance machine 10. As such, were the system 1 to detect that the unmanned vehicle was actually 505 m behind the maintenance machine 10, the system 1 would increase the speed of the drive motors 11 to decrement the distance between the unmanned vehicle 19 and the maintenance machine 10 and vice versa.

In embodiments, where the maintenance machine 10 to travel at a speed greater than the maximum speed of the unmanned vehicle 19 such that the unmanned vehicle 19 fell behind the maintenance machine 10 beyond a threshold beyond the route offset, the autonomous unmanned vehicle 19 may be configured for sending a notification message to the maintenance machine 10 so as to alert the operator accordingly. Such notifications may be sent in other circumstances where the autonomous unmanned vehicle 19 is unable to keep up with the maintenance machine 10 such as during battery depletion and the like.

Now, in addition to controlling the distance of the autonomous unmanned vehicle 19 behind or forward the maintenance machine 10, the system 1 is further configured for controlling the lateral offset of the unmanned vehicle 19 with respect to the road verge.

Vision Sensor Subsystem 15

Now, as can be seen from the embodiment described in FIG. 1, the autonomous unmanned vehicle 19, in embodiments, comprises a vision sensor subsystem 15 configured for the purposes of determining the actual lateral offset of the autonomous unmanned vehicle 19 with respect to the road verge. In general terms, the vision sensor subsystem 15 is configured to recognise the surroundings of the autonomous unmanned vehicle 19 so as to be able to calculate the actual lateral offset of the autonomous unmanned vehicle 19 with respect to the road verge.

As such, in this embodiment, the vision sensor subsystem 15 comprises an image capture device 16 adapted to capture image or video data of the surrounds of the autonomous unmanned vehicle 19 for the subsequent processing as will be described in further detail below. In embodiments, the vision sensor subsystem 15 comprises side facing cameras so as to view sideways from the unmanned vehicle 19 at the road verge. In other embodiments, the cameras may be forward-facing but wide angled so as to be able to view the road verge and other indica at differing offsets.

The vision sensor subsystem 15 may further comprise a road verge recognition module 17 configured for recognising the road verge in accordance with image data from the image capture device 16.

The vision sensor subsystem 15 may further comprise an offset determination module 18 configured for determining an offset of the autonomous unmanned vehicle 19 with respect to the recognised road verge as is recognised by the recognition module 17.

There are a number of ways in which the vision sensor subsystem 15 may recognise a road verge.

In one embodiment, the vision sensor subsystem 15 may identify the edge line marking of the road. Specifically, highway edges may be provided with white or yellow line markings which may be utilised by the vision sensor subsystem 15 in accordance with an appropriate image recognition technique, such as colour recognition and/or shape recognition.

In scenarios where no edge line markings are provided, such as on rural roads or the like, the vision sensor subsystem 15 may recognise the road centreline. In this embodiment, the image capture device 16 may be orientated accordingly so as to be able to view the road centreline. In this embodiment the vision sensor subsystem 15 may be configured for recognising differing road centre lines, such as including solid and broken road centrelines. For broken road centre lines, the vision sensor subsystem 15 may be configured for interpolating between sections of the broken centreline.

In scenarios where no road line markings are provided, the vision sensor subsystem 15 may be configured for determining the road verge in other manners. In one manner, the vision sensor subsystem 15 may be configured for recognising the transition from the asphalt to gravel and a road verge. Such recognition may be done utilising colour recognition technique.

In embodiments, the image capture device 16 may additionally or alternatively capture infrared so as to be able to ascertain the differing heat signatures between the usually darker road asphalt and the lighter gravel edge.

In other embodiments the vision sensor subsystem 15 may be configured for recognising other roadside features such as roadside barriers and the like.

In a preferred embodiment, for greater accuracy, the vision sensor subsystem 15 may be configured for recognising the verge in accordance with a combination of features, including those described above, including by employing weighting or fuzzy logic depending on the significance of the roadside indica. For example, the vision sensor subsystem 15 may recognise the road verge in using the edge line marking alone should such be available and fall back to a combination of centreline marking and asphalt/gravel transition detection were edge line marking is unavailable.

It should be noted that road verge detection may be performed in other manners within the purposive scope of the embodiments described herein. For example, for regularly travelled road sections active or passive transducers may be placed along the road verge for detection by the autonomous unmanned vehicle 19. Such transducers may comprise a radiofrequency resonance circuits configured for responding to a frequency emitted by a complimentary radiofrequency emitter located on the autonomous unmanned vehicle 19. In further embodiments, proximity sensors, such as acoustic, laser or radiofrequency proximity sensors may measure the distance to the road verge such as to the roadside barrier or other detectable road verge indicative feature.

Turning now to FIG. 2, there is shown an exemplary formation. Specifically, as alluded to above, the formation comprises the maintenance machine 10, a leader unmanned vehicle 19 and two follower unmanned vehicles 19.

As can be appreciated from the exemplary formation, the unmanned vehicles 19 may be beyond the line-of-sight of the maintenance machine 10. It is for this reason that the above described system methodology utilises the location data as is received from the mentioned machinery 10 and the unmanned vehicle 19 as opposed to vision, radar or rather technique.

Data Connectivity

As such, referring to FIG. 1, both the autonomous unmanned vehicle 19 and the maintenance machine 10 may comprise a network interface 5 configured for sending and receiving data, including for sending location data representing their respective locations.

In embodiments, the network interface 5 may be a long-range network interface, such as a cellular network interface so as to be able to send and receive data across several kilometers. Typically highways and the like have sufficient cellular coverage so such a system may be suitable in these embodiments. For rural application where cellular coverage is intermittent other long-range radio communication may be employed.

In the embodiment shown in FIG. 1 the autonomous unmanned vehicle 19 and the maintenance machine 10 may communicate with a server 2 connected to the network 6. However, in rural applications where cellular coverage is unavailable the maintenance machine 10 may be configured for communicating directly with the autonomous unmanned vehicle 19 such as by comprising the suitable long-range radio data channel. In this embodiment, the long-range radio data channel may be configured for transmitting data across several kilometers so as to be suited for communicating with the unmanned vehicle 19 in a wide range of scenarios. In this embodiment, the maintenance machine 19 may comprise a radio data channel connectivity status indicator so as to prompt the operator of the maintenance machine 10 should the autonomous unmanned vehicle 19 fall out of data communication range.

In embodiments, the autonomous unmanned vehicle 19 and the maintenance machine 10 may communicate using an 802.11 ad hoc Wi-Fi network.

Lead Unmanned Vehicle

Now, as can also be seen from FIG. 2, and as alluded to above, the formation may comprise an unmanned vehicle 19 configured for leading the maintenance machine 10. In this manner, the lead unmanned vehicle 19 may warn of oncoming traffic.

In this embodiment, the lead unmanned vehicle 19 must rely only on the ascertained locations of the maintenance machine 10 and the lead unmanned vehicle 19 and the determined lateral offset from the road verge to travel. However, in embodiments, the control of the lead unmanned vehicle 19 may be complimented by route data which may have been ascertained from a previous maintenance along the route.

The route data may be utilised to complement and increase the accuracy of the lead unmanned vehicle 19. For example, and noting that GPS location data may be inaccurate to 10 m, being unsuitable for determining the lateral offset of the unmanned vehicle 19, the determined lateral offset of the unmanned vehicle 19 as ascertained by the vision sensor subsystem 15 may be compared to the route data so as to, for example, flag and error should the route data and determine offset from the road verge differ by greater than a threshold.

Following Unmanned Vehicle

As can be also seen from FIG. 2, the formation comprises two following unmanned vehicles 19 configured for following the maintenance machine 10. It should be noted that for data connectivity purposes, the unmanned vehicles may comprise data repeaters so as to allow for the repeating of data along a daisy chain of unmanned vehicles 19.

In this embodiment, the system 1 may generate a maintenance machine waypoint route representing the actual route travelled by the maintenance machine 10 for enhancing the accuracy of the following unmanned vehicles 19. Specifically, as the maintenance machine 10 travels, at predetermined intervals, such as every second, the system 1 may record the location of the maintenance machine 10 as ascertained by the GPS receiver 9 of the maintenance machine 10 so as to create a waypoint route or "digital breadcrumb trail" of the routes travelled by the maintenance machine 10.

In this embodiment, the follower unmanned vehicles 19 may compare the determined lateral offset from the vision sensor subsystem 15 with the generation waypoint route so as to be able to identify potential inaccuracies of the compilations from the vision sensor subsystem 15.

In embodiments, the follower unmanned vehicles 19 may follow the digital breadcrumb route waypoint trail only given that such may be accurate enough to forgo the need for lateral roadside verge detection especially where differential GPS techniques are utilised for overcoming selective availability inaccuracies. In this embodiment, the system 1 may utilise differential GPS hardware.

Waypoint Route for Route Distance Calculation

Furthermore, the waypoint route generated in this manner may be utilised for the purposes of correctly positioning the route offset distance of the unmanned vehicle 19.

Specifically, as can be seen, the distance between the maintenance machine 10 and the unmanned vehicle 19 immediately behind cannot accurately be calculated using line-of-sight calculation using the GPS locations of the maintenance machine 10 and the unmanned vehicle 19 on account of the maintenance machine 10 having travelled around a bend.

As such, in this embodiment, the system 1 is configured for calculating the appropriate route offset distance by taking into account the bend as is ascertainable from the waypoint route recorded by the system 1.

As alluded to above, for the lead unmanned vehicle 19, as the generated a waypoint route for the maintenance machine 10 may not be available, the system 1 may be required to utilise a predetermined waypoint route (which may have been recorded from a previous maintenance job) for the purposes of correctly positioning the forward route offset distance of the lead unmanned vehicle 19.

Object Avoidance

In embodiments, the unmanned vehicles 19 may be configured with object avoidance capabilities so as to, for example, be able to avoid roadside posts when following a maintenance machine 10.

In one embodiment, the vision sensor subsystem 15 may be provided with an obstacle detector model 22 for the purposes of visually ascertaining obstacles ahead. For example, the vision sensor subsystem 15 may visually identify forward located roadside obstacles, such as road post and the like so as to be able to adjust the path travelled by the unmanned vehicle 19 so as to avoid the obstacle.

In embodiments, as opposed to utilising vision recognition technique for the purposes of identifying forward located obstacles, the autonomous unmanned vehicle 19 may comprise other object sensing technique, such as proximity base sensors, such as ultrasonic sensors, Lidar laser sensors and the like. In embodiments, additionally or alternatively, the autonomous unmanned vehicle 19 may comprise a bump sensor to detect if the autonomous unmanned vehicle 19 bumps into an object. If so, the autonomous unmanned vehicle 19 may be configured to reverse a distance and alter course.

In embodiments, the above-described waypoint route may be utilised for object avoidance. For example, where the maintenance machine 10 drives forward to cut the grass around a post and then subsequently reverses so as to take a path around the post, the system 1 may recognise the reversing portion of the route so as to be able to interpolate a following route for the following autonomous unmanned vehicle 19 taking into account the reversal of the maintenance machine 10 and the driving around the obstacle. As such, for portions of the waypoint route for which the maintenance machine 10 has reversed, the system 1 may interpolate a route to avoid the reversal portion so as to join the next forward travel portion of the route of the waypoint machine 10.

In embodiments, the system 1 may control unmanned vehicles 19 to avoid obstacles such as wherein, for example, a cow steps into the path previously taken by the maintenance machine 10 such that when the car was detected by the object detection subsystem of the unmanned vehicle 19, the system 1 may plant a new route around the obstacle.

Maintenance Plan Formation Control

As alluded to above, roadside grass cutting and other routes and maintenance is often times performed in accordance with a maintenance plan. The maintenance plan takes into account roadside conditions such as the speed of vehicles and the like. For example, for roadside grass cutting on the highway, the maintenance plan may require that a maintenance machine 10 comprises a most rearward unmanned vehicle 19 driven off-road comprising speed limiting signage to reduce the speed of motorist from 110 km/h to 60 km/h and then a subsequent on road unmanned vehicle 19 comprising further warning signage. Such roadside maintenance plan may differ from a rural road for example, having differing speed conditions, being dual carriageway and the like.

As such, in embodiments, the maintenance machine 10 may comprise a graphical user interface 25 operable by the operator to control the formation control of the unmanned vehicles 19. Such interface 25 may be provided by way of a portable computing device have an appropriate display.

As such, utilising the formation control 26 of the interface 25, the operator may configure, such as by selecting from appropriate drop-down fields specifying the type of highway, type of maintenance and the like, a particular type of maintenance such that the appropriate formation may be selected by the system 1.

It should be noted that the graphical user interface may comprise a higher level of abstraction allowing the operator to simply nominate the type of maintenance being performed such that the system 1 ascertains the appropriate formation control in accordance with an maintenance plan or alternatively the operator may specify the type of formation, such as by individually selecting each unmanned vehicle, configuring the route offset distance (either rearward or forward) and configuring the lateral offset from the road verge.

In embodiments, the maintenance plan 20 may be ascertained from a local database 21, especially advantageous were the maintenance machine 10 is out of data connectivity from the central server 2. However, in the embodiments where the maintenance machine 10 is within data range of the server 2, the maintenance plan may be downloaded from a maintenance plan table 4 of a database 3 located on the server 2.

Operational Mode Formation Control

The formation of the unmanned vehicles 19 may be further configured in accordance with an operational mode. For example, during grass cutting mode the unmanned vehicles 19 may take the configuration as substantially shown in FIG. 2.

Figure 7:
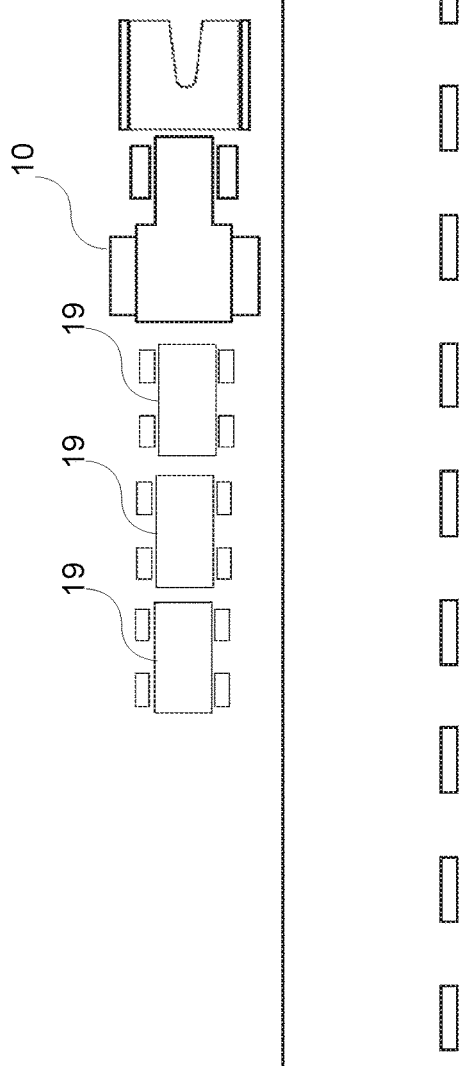

However, when grass cutting is no longer being performed and the maintenance machine is required to return to a depot, the unmanned vehicles in the 19 may be configured to take the close-in following formation as substantially shown in FIG. 7. As such, once having performed appropriate cutting, the operator may control the formation control 26 to specify that the maintenance machine 10 is no longer in grass cutting mode such that the unmanned vehicles 19 automatically travel up to and closely follow the maintenance machine.

Figure 8:
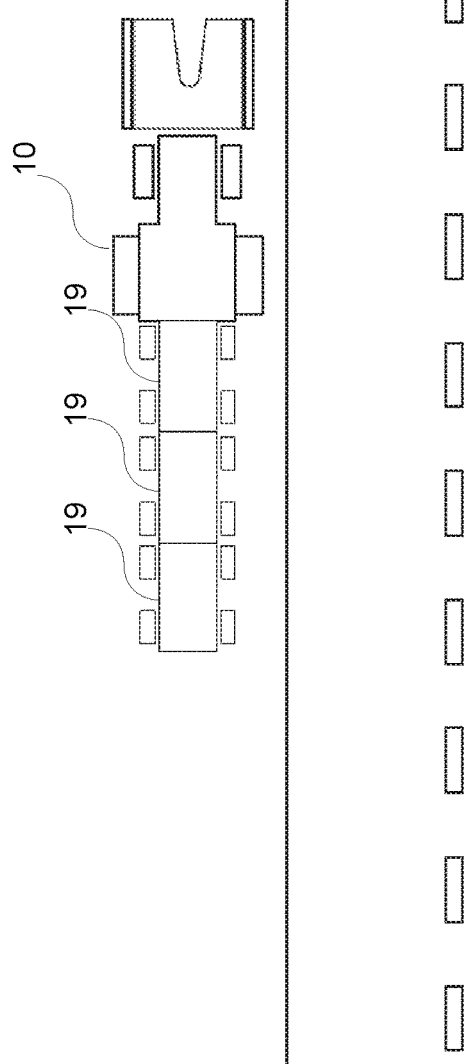

In embodiments, and so as to avoid having to travel in close formation, the following unmanned vehicles in 19 may be physically coupled together such as shown in the embodiment shown in FIG. 8.

In one embodiment, once having cut the verge of a road, the maintenance machine 10 may wish to cross over to cut the other verge. In this embodiment the unmanned vehicles in 19 may be configured to take the close-in following formation as substantially shown in FIG. 7 so as to allow the maintenance machine 10 to cross the road. However, in other embodiments the unmanned vehicles 19 may be configured for autonomously crossing the road.

For example, at a relatively safe stretch with no vehicles in sight, the operator may instruct the unmanned vehicles 19 to cross over to the other side of the road so as to be able to resume operational in the opposite direction. In embodiments, the unmanned vehicles 19 may comprise vehicle detection means, such as a radar or vision detection means so as to ascertain when the road is clear to cross.

In embodiments, vehicle detection means may be utilised for the purposes of alerting the operator of the maintenance machinery of oncoming vehicles. For example, for a rearward or forward located unmanned vehicle 19, should the unmanned vehicle 19 detect a passing vehicle, a data signal may be sent to the maintenance machine 10 to display, using the graphical user interface 25 an indication of a forward or rearward approaching vehicle.

Signage

As alluded to above, the unmanned vehicles 19 are configured for displaying appropriate signage. Different types of signage may be employed within the purposive scope of the embodiments described herein.

For example, in one embodiment, the autonomous unmanned vehicle 19 may comprise a set physical sign, such as a speed limitation sign and other warning signs, such as, for example, warning motorists to slow down to 80 km/h as road cutting machinery is ahead. In embodiments, the signage may be interchangeable so as to allow for differing signage to be displayed. Such may be done manually, such as by interchanging signs, or where a mechanical arrangement is configured to raise and lower or scroll differing physical signs.

However, in a preferred embodiment, the signage 13 of the unmanned vehicle 19 is electronic such as by comprising a high visibility colour LED display device. In this manner, many different types of signs may be displayed depending on the application.

For example, the LED display device may be configured for displaying a red and white speed limiting sign or a yellow warning sign or a combination of both.

In a preferred embodiment, the signage 13 is dynamically controllable by the system 1.

In one embodiment, the signage 30 may be configured to display the route distance between the maintenance machine 10 and the unmanned vehicle 19. For example, the unmanned vehicle 19 may display a sign saying "Warning—grass cutting machine 470 m ahead". In this embodiment, the signage is automatically controlled by the system 1.

In embodiments, the signage may display various operational modes of the maintenance machine 10, such as indicating to motorists whether the grass cutting machinery is currently cutting, whether the grass cutting machinery is stationary, whether the grass cutting machinery is performing a U-turn or the like. Again, such signage may be automatically displayed by the system 1 without operator intervention.

However, in embodiment also, the operator of the maintenance machine 10 may configure the signage accordingly. As such, the graphical user interface 25 may further comprise a signage control 27 allowing the operator to specify the appropriate signage. The signage control 27 may for example, comprise a plurality of drop-down fields allowing the operator to select the type of signage to control. Furthermore, in embodiments, the signage control 27 may allow the configuration of each type of sign such as to, for example, allow the operator to select a speed limiting signage and subsequently set the speed limit.

Again, the signage control may be specified specifically by the operator or alternatively controlled in accordance with the maintenance plan 20.

Single Lane Traffic Control

Figure 6:
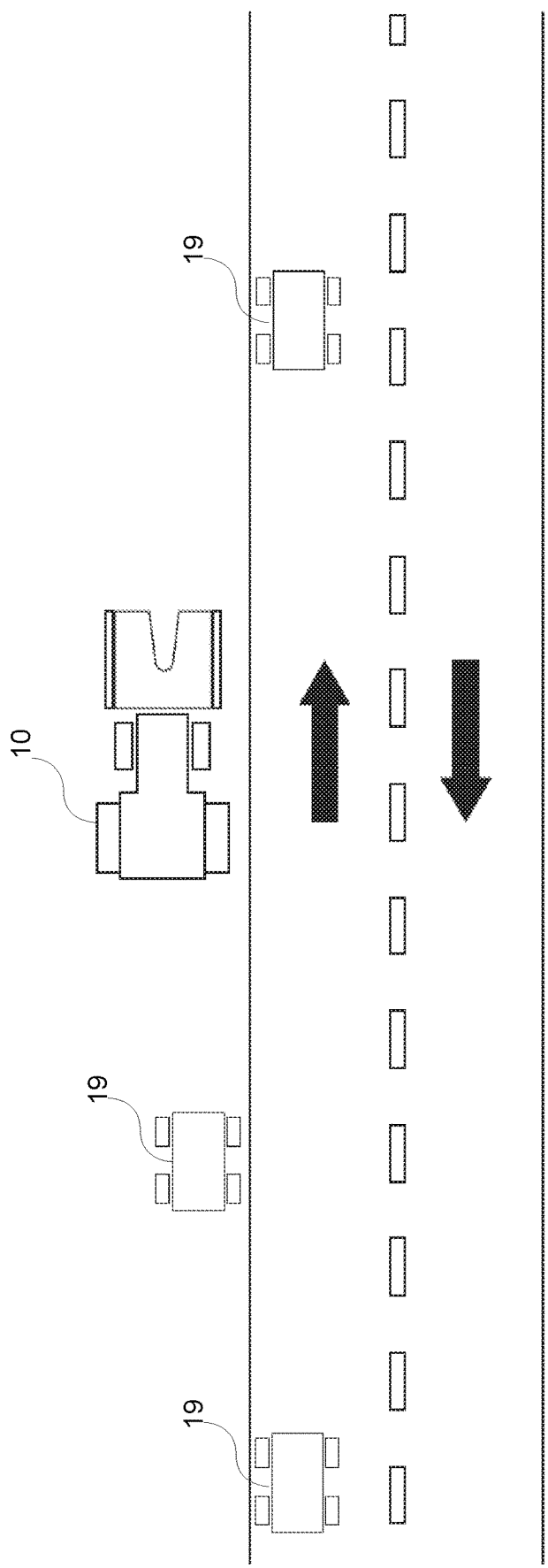

In embodiments, the unmanned vehicles 19 may be configured for traffic control. Specifically, reference is made to FIG. 6 showing an application for use of the system 1 on a dual carriage road wherein the unmanned vehicles 19 are required to close the lane adjacent the maintenance machine 10.

In this embodiment, the unmanned vehicles 19 may comprise speed control signage, such as a red and green lights indicating to motorist whether the motorists must stop or go.

For example, in a first mode of operation in this embodiment the unmanned vehicles 19 may cooperate to allow oncoming traffic to flow. In this embodiment, the forward unmanned vehicle 19 may comprise a green light indicating to motorists to travel ahead whereas the rearward unmanned vehicle 19 comprises a red sign indicating to motorist to stop.

Furthermore, in this embodiment, the unmanned vehicle 19 displaying the stop sign may be stationary whereas the unmanned vehicle 19 comprising the green sign may travel so as to allow the unmanned vehicles 19 to alternatively "leapfrog" to keep up with the maintenance machine 10.

In further embodiments, the unmanned vehicles 19 are configured for counting the passing cars so as to be able to switch lanes in a manner negating the need for a predetermined delay which may cause traffic congestion.

For example, in the mode of operation allowing the oncoming traffic to flow the forward unmanned vehicle 19 displaying the green light make on the number of cars passing by so as to, for example, count that 5 cars have passed prior to displaying the red light. Furthermore, the rearward unmanned vehicle 19 displaying the red light may count the number of cars passing so as to be able to immediately display the green light once the fifth car has passed. In embodiments, to account for miscounting the system 1 may implement a timer override.

Now, in a second mode of operation each unmanned vehicles 19 cooperate to allow the rearward traffic to flow. In this mode of operation, the rearward unmanned vehicle 19 displays the green light allowing the rearward traffic to flow whereas the forward unmanned vehicle 19 displays a red light to hold the oncoming traffic.

Exemplary Formations

Various exemplary formations will now be discussed in turn with reference to the exemplary formations shown in FIGS. 2-10.

Specifically, referring to FIG. 2, there is shown an exemplary formation comprising the maintenance machine 10, a single lead unmanned vehicle 19 and two follower unmanned vehicles in 19. As can be seen, in this embodiment, the unmanned vehicles 19 are configured for driving off-road that is, beyond the verge of the road as determined by the vision sensor subsystems dual 15 of the unmanned vehicles 19.

However, in embodiments, the lateral offsets of certain of the unmanned vehicles 19 may be configured differently. Specifically, turning to FIG. 3, there is shown the leading and most rearward unmanned vehicle 19 being laterally offset towards the road so as to travel on road. In embodiments, the system 1 may be configured so as to be able to configure the unmanned vehicles 19 to drive on road or off-road, including the distances thereon, such as 2 m on-road, 5 m off-road and the like.

Figure 4:
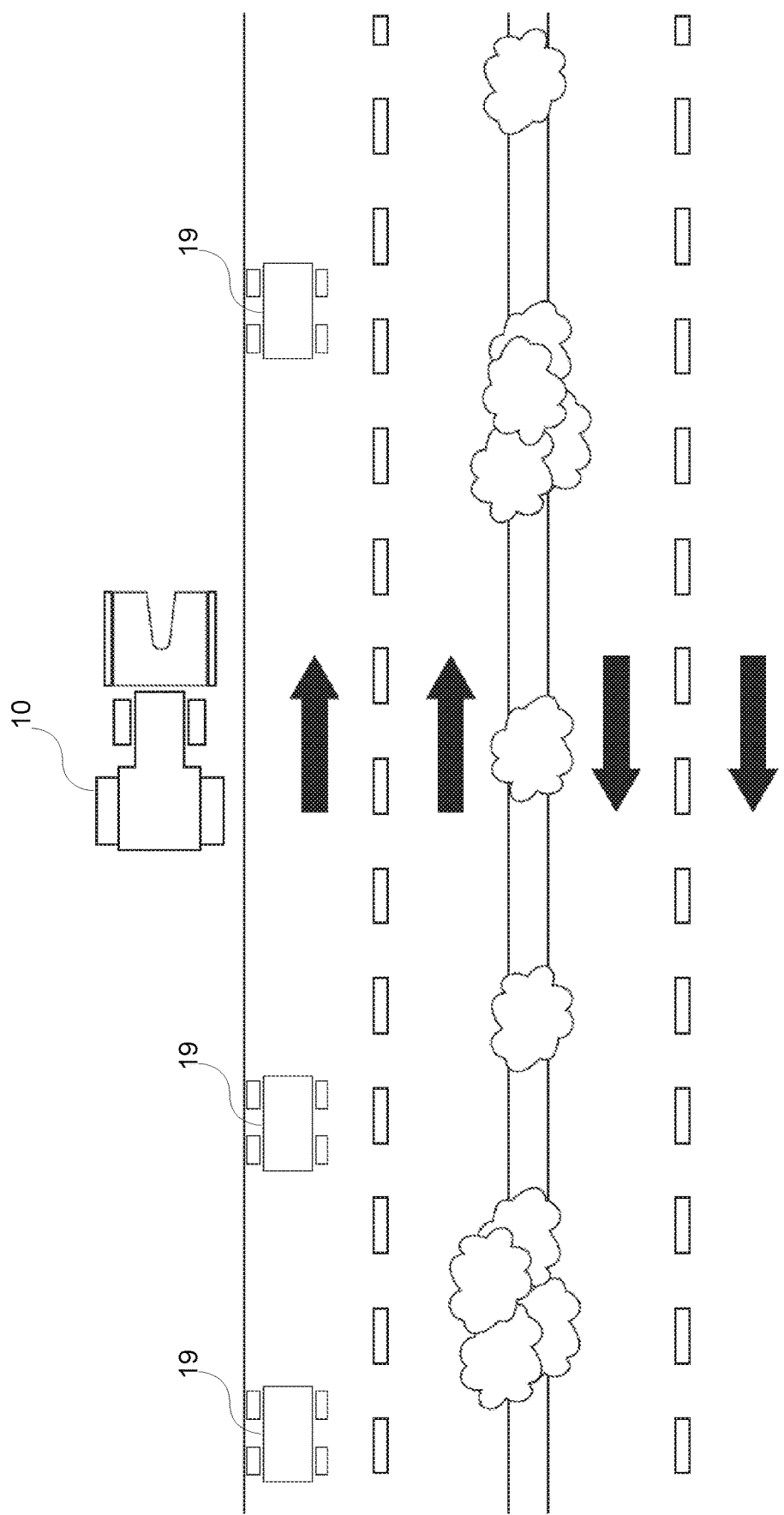

FIG. 4 shows the application of the system 1 for use on highways wherein, as can be seen the highway comprises two dual lane roads for respective directions of traffic. In the embodiment shown, the maintenance machine 10 is cutting grass along the direction of travel of a first lane wherein 3 unmanned vehicles are deployed for signage purposes comprising two trailing unmanned vehicles 19 and one leading unmanned vehicle 19.

In this embodiment, the rearward unmanned vehicles 19 may comprise speed limitation signage whereas the leading unmanned vehicle 19 may comprise speed limit resumption signage.

Figure 5:
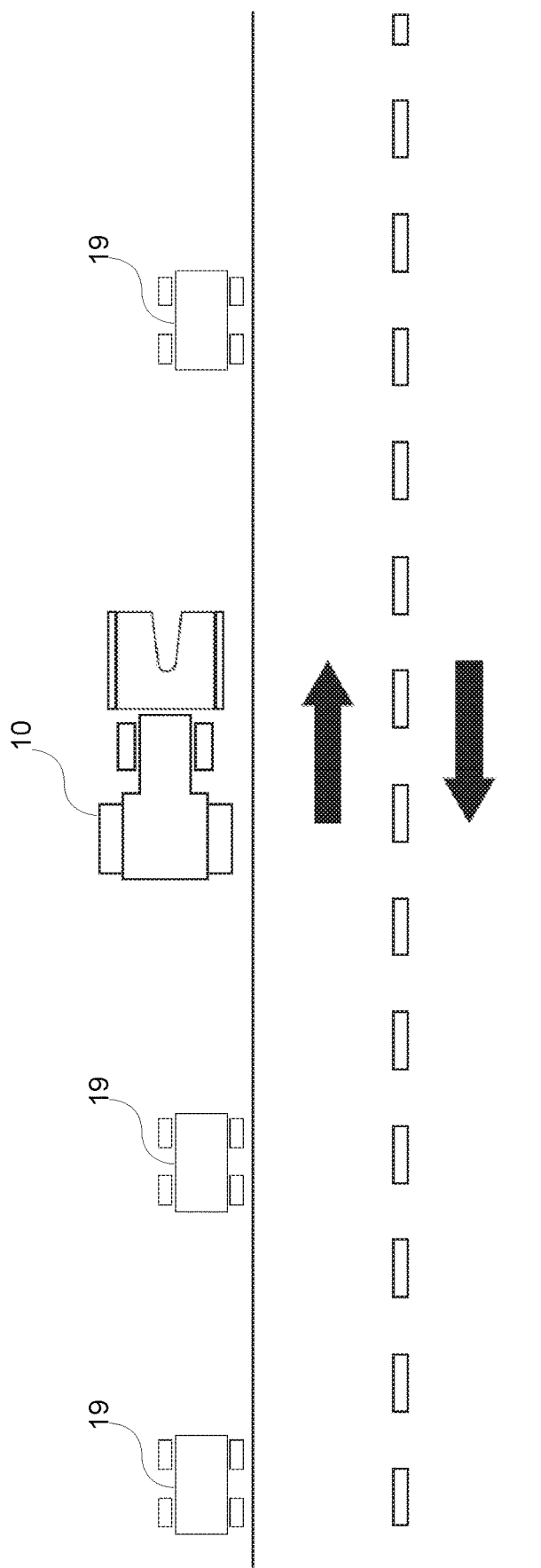

FIG. 5 shows a differing application of the system 1 as compare to FIG. 4 wherein, as can be seen, the system 1 is employed for dual carriageway roads comprising a shared road having lanes in opposite directions. In this embodiment, as can be seen, the unmanned vehicles will 19 are configured for off-road driving.

FIG. 6 shows a further application on dual carriageway roads wherein, as can be seen, the leading 19 and most rearward following unmanned vehicle 19 are configured for on road driving whereas the most proximate following unmanned vehicle 19 to the working machine 10 is configured for off-road driving.

As alluded to above, FIG. 7 shows a nonworking mode configuration in instances, such as, for example wherein the maintenance machinery 10 is not performing maintenance such as wherein the maintenance machinery 10 is a grass cutter and is travelling on or from site. In this embodiment, the unmanned vehicles 19 have been configured to closely follow the maintenance machinery.

Similarly, as alluded to above for 8 shows the physical coupling together of the unmanned vehicles 19 to suit the transportation of the unmanned vehicles 19 without the unmanned vehicles 19 necessarily having to be operational, depleting their batteries and the like.

Figure 9:
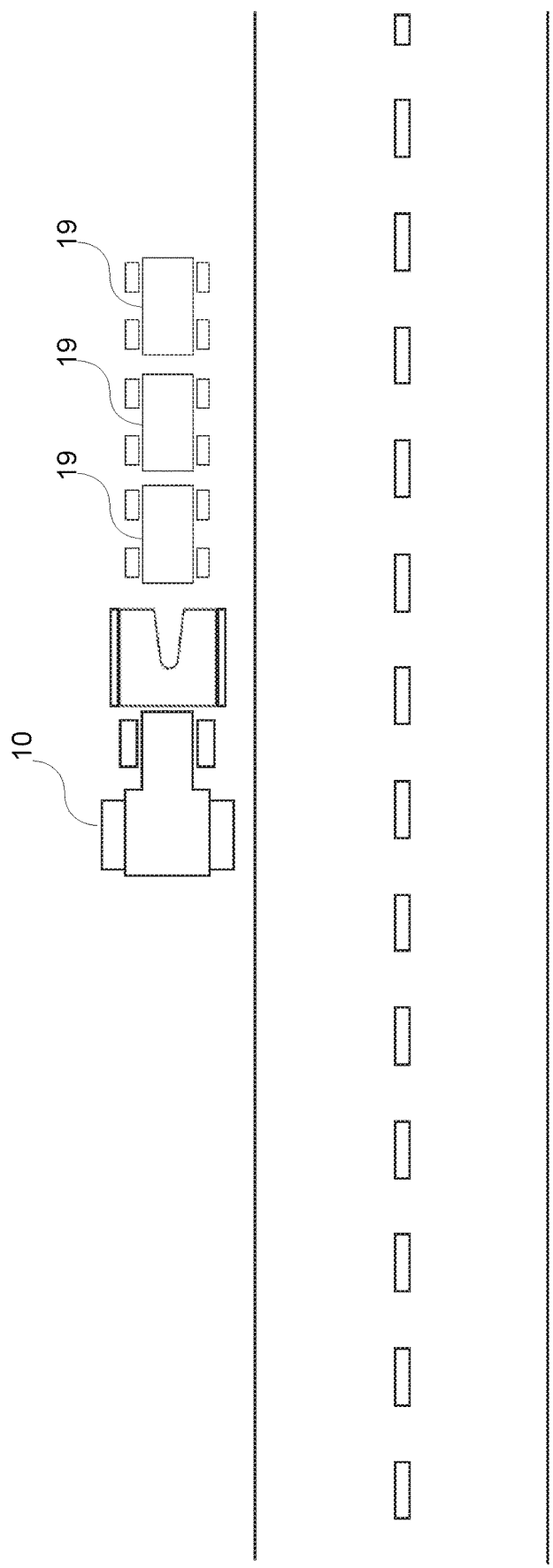
Figure 10:
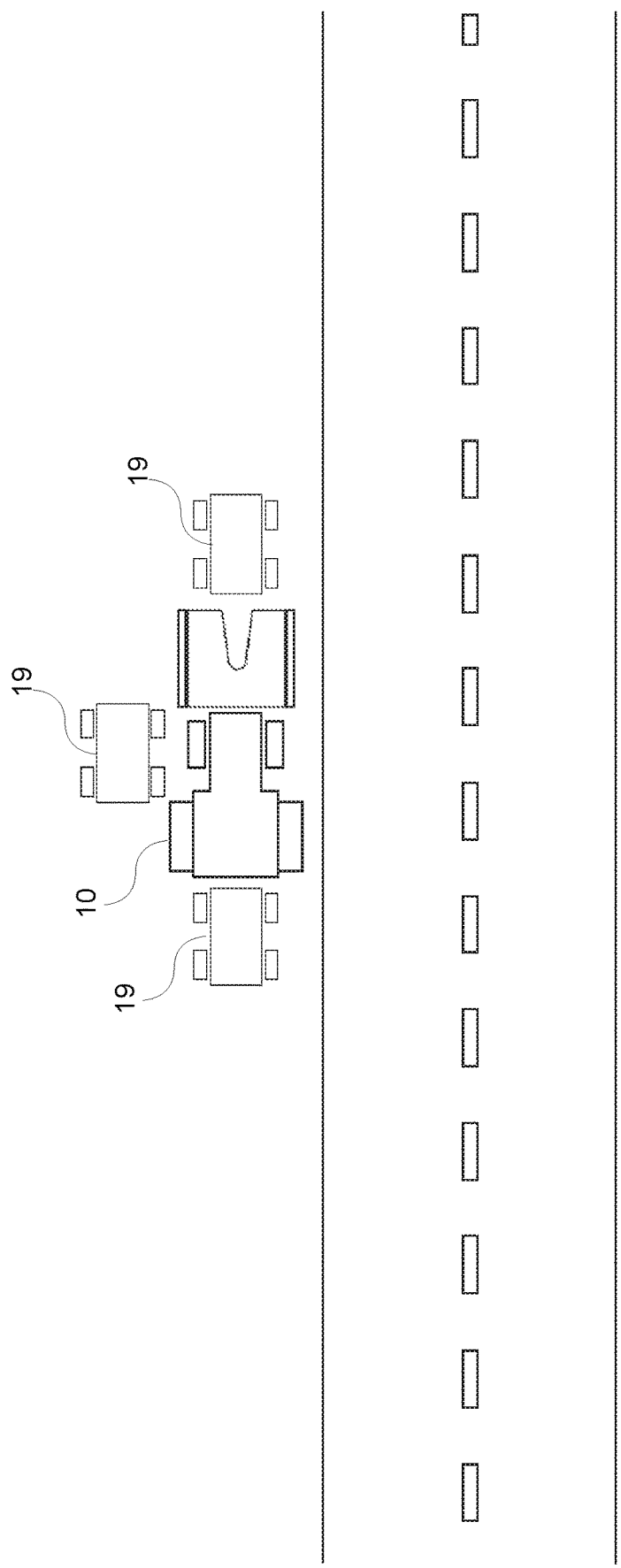

FIG. 9 shows a formation wherein the unmanned vehicles 19 are deployed in close leading configuration. In this embodiment, the leading unmanned vehicles 19 may be configured to follow a predetermined route in front of the maintenance machine 10.

It should be noted that in this close-knit formations the unmanned vehicles 19 may rely on additional navigational aids as opposed to the above described GPS and lateral offset vision sensor subsystems. For example, the unmanned vehicles 19 may rely on light or laser guidance reflecting from the property located reflectors of the maintenance machinery 10 or adjacent unmanned vehicles 19 for further enhancing the accuracy of the formation.

As such, for the example shown in FIG. 9, utilising these additional navigational aids, the unmanned vehicles 19 may steer in accordance with the orientation of the maintenance machine 10, such that, when the maintenance machine 10 turns, the unmanned vehicles 19 are able to steer accordingly in utilising the additional navigational aid.

For the 10 shows a further close-knit configuration wherein, as can be seen, in addition to the leading and trailing unmanned vehicle 19, the formation further comprises an off-road lateral unmanned vehicle 19.

Fire Management

In the above embodiments, whereas the system 1 was described primarily with reference for roadside signage, in embodiments, the system 1 has application for fire management also.

Specifically, in embodiments, maintenance machinery may encounter bushfires, including those sparked by the maintenance machinery itself, such as during the grass cutting process. As such, as opposed to the conventional arrangement of the machinery operator having to manually utilise a fire extinguisher or the like in an attempt to suppress the fire, there will now be described an embodiment wherein the system 1 utilises the autonomous unmanned vehicles 19 for fire management.

It should be noted that the fire management functionality as is described herein may be used in addition to the road signage functionality described above or as an alternative thereto. In other words, the fire management functionality in accordance with this embodiment may be utilised to complement the roadside signage functionality or utilises a standalone application wherein signage is not employed.

Figure 12:
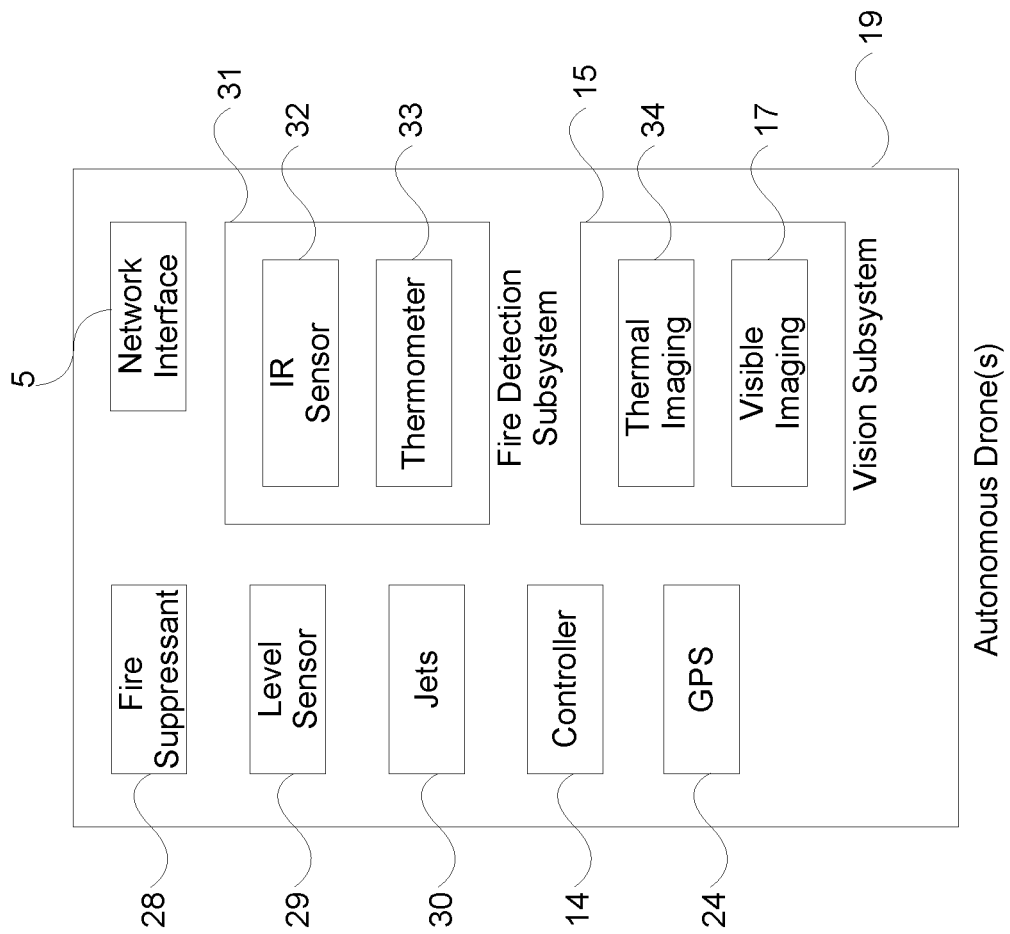
FIG. 12 shows an unmanned vehicle configured for roadside fire management in accordance with an embodiment of the present disclosure.

As such, turning now to FIG. 12, there is shown an embodiment wherein the autonomous unmanned vehicle 19 has fire management capabilities.

As can be seen, the autonomous unmanned vehicle 19 in this embodiment comprises a fire suppressant tank 28 for the purposes of storing fire suppressant. Differing types of fire suppressant may be employed depending on the particular application such as water, foam, powdered chemicals and the like. However, in a preferred embodiment, water is preferred given its relative availability and cost considerations. The fire suppressant tank 28 may comprise sufficient volume for being able to manage fire for a suitable period of time. In one embodiment, the fire suppressant tank 28 may be a 1000 L water tank.

The unmanned vehicle 19 may further comprise a level sensor 29 operably coupled to the fire suppressant tank 28 for determining the level of the tank 28.

In an embodiment, the unmanned vehicle 19 may report the level of the tank 28 via the network interface 5 to the maintenance machine 10 or server 2 such that the tank 28 may be refilled if necessary.

The unmanned vehicle 19 further comprises at least one jet 30 for the purposes of spraying fire suppressant from the fire suppressant tank 28.

In one environment, the at least one jet 30 may be configured for the purposes of protecting the unmanned vehicle 19. For example, were the maintenance machine to spark a bushfire, rather than having the bushfires sweep across and destroy the attendant unmanned vehicles 19, each attendant unmanned vehicle 19 may operate the jets 30 to create a protective veil of water so as to allow the fire to pass the unmanned vehicles 19 safely.

However, in a preferred, the unmanned vehicles 19 are used for fire fighting.

In one embodiment, the autonomous unmanned vehicle 19 is configured for receiving fires suppressing control instructions from the maintenance machine 10 via the network interface 5 and spraying fire suppressant from the at least one jet 30 accordingly. As such, in the event of a fire, the maintenance machine 10 operator may remotely control the autonomous unmanned vehicle 19 for fire fighting.

For example, the graphical user interface 25, or other manual control or the like may comprise controls allowing the operator to control the autonomous unmanned vehicle 19 to fight the fire. In the embodiment described above wherein the autonomous unmanned vehicle 19 is in maintenance machine 10 following mode, during the event of a fire, the operator may take over the control of the unmanned vehicle 19 for fire fighting.

In embodiments, the operator may control the spraying of fire suppressant from the jets 30 which may include controlling the volumetric flow rate of fire suppressant. Furthermore, in an embodiment, the jets 30 may be directional jets such that the operator may control not only the lateral angle but also the elevation angle of the jets 30 so as to be able to target fires at differing distances and directions with respect to the unmanned vehicle 19. Yet further, where more than one jet 30 is provided, the operator may configure which jets 30 are to be actuated, so as to be able to so as to, for example, actuate jets on the right-hand side of the unmanned vehicle 19 to target a fire on the right of the unmanned vehicle 19.

While controlling the unmanned vehicle 19 for fire management the operator may also control the motors 11 and the steering 12 so as to position the unmanned vehicle 19 appropriately. Also, with signage 13 is employed, the signage 13 may be updated to warn motorists of the proximate fire.

In an embodiment, the unmanned vehicle 19 may comprise a fire detection subsystem 31. The fire detection subsystem 31 is configured for detecting a fire in use, primarily through the heat signature of the fire. In this manner, the fire detection system 31 may comprise a thermometer 33 for detecting a fire upon contact or an infrared sensor 32 for detecting infrared radiation for detecting fire at a distance.

In this embodiment, the fire detection subsystem 31 may be configured for sending a fire detection alert to the maintenance machine via the network interface 5. Specifically, during roadside maintenance, a fire may occur behind the maintenance machine 10, thereby going unnoticed to the operator thereof. As such, by receiving an alert from an unmanned vehicle 19 behind the maintenance machine 10 the operator may be alerted in good time so as to be able to take appropriate action before the fire spreads.

In embodiments, so as to assist the operator of the maintenance machine 10 in managing the fire, the vision subsystem 15 may comprise a visible imaging camera 17 or a thermal imaging camera 34 so as to be able to send visible or thermal imaging data via the network interface 5 to the maintenance machine 10 for display by the operator. The thermal imaging is especially advantageous where visible imaging is obscured by smoke.

As opposed to the unmanned vehicle 19 being controlled by the maintenance machine 10 for fire fighting and management, in embodiments, the unmanned vehicle 19 may be configured for taking action in an automated manner upon detecting a fire. As such, upon the fire detection subsystem 31 detecting a fire, the unmanned vehicle 19 may be configured to automate the spraying of fire suppressant from the jets 30 accordingly.

For example, the infrared sensors 32 may be configured to sense infrared radiation around the entire periphery of the unmanned vehicle 19 such that, should the infrared sensors 30 detect infrared radiation exceeding a predetermined threshold from a particular direction, the unmanned vehicle 19 may actuate the jets 30 pointing in that direction so as to retard the fire accordingly. Where the fire detection subsystem 31 is configured for determining a distance to the fire also, the unmanned vehicle 30 may further configure the jets such as by controlling the output volumetric flow rate or the elevation angle so as to reach the fire at the distance determined.

In an embodiment, the unmanned vehicle 19 may be configured to enter a fire following and suppression mode wherein, upon detection of the fire, the unmanned vehicle 19 is configured for following the fire while spraying suppressant to retard the flames. Specifically, were the unmanned vehicle 19 operating in following mode and detect a grass fire or the like, the unmanned vehicle 19 may automatically enter a fire following and suppression mode wherein the unmanned vehicle 19 approaches the fire front (and may also initiate the above described protective veil to protect the unmanned vehicle 19) and wherein, when at the fire front, the unmanned vehicle 19 may spray fire suppressant 28 via the jets 30 from the fire suppressant tank 28. As the fire is suppressed along the fire front, the unmanned vehicle may work along the line of the fire front until such time that the fire is extinguished. In embodiments, where two unmanned vehicles 19 available, the unmanned vehicles 19 may communicate via the network interface such that one unmanned vehicles follows in one direction along the fire front while the other unmanned vehicle 19 follows in the opposite direction along the fire front.

Pedestrian Maintenance

Whereas in the above embodiments has been described roadside maintenance utilising maintenance machinery 10 such as tractors, vehicles and the like, it should be noted that in embodiments the system 1 may be equally applicable for pedestrian maintenance wherein, for example, council workers and the like may walk along a road verge manually spraying weedkiller from a backpack device or the like. In this embodiment, signage unmanned vehicles 19 may similarly be employed to warn approaching motorists of the pedestrian maintenance workers.

In this embodiment, the maintenance workers may carry a small form factor computer device comprising the features and functionality described above which, in environments may take the form of a tablet computer device or the like comprising the GPS 9, network interface 5 and other functionality for the purposes of implementing the functionality described herein.

Exemplary Physical Embodiment

Turning now to FIG. 13-16, there is shown an exemplary physical embodiment of the unmanned vehicle 19 in accordance with one particular aspect. As can be seen, the unmanned vehicle 19 comprises a low profile vehicular body having rearward located signage 13.

Figure 15:
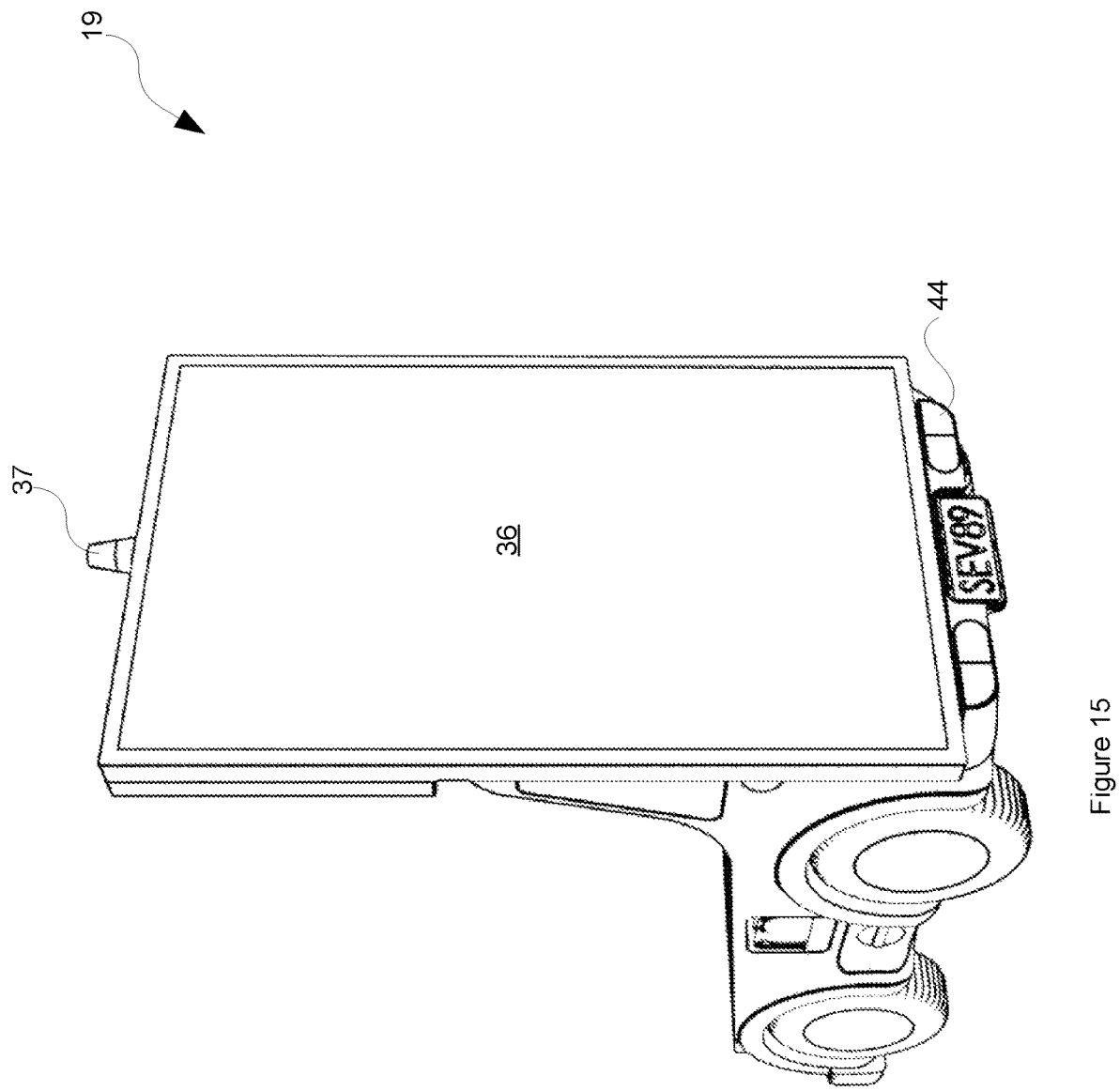
FIG. 15 shows a rear perspective view of the unmanned vehicle.
Figure 16:
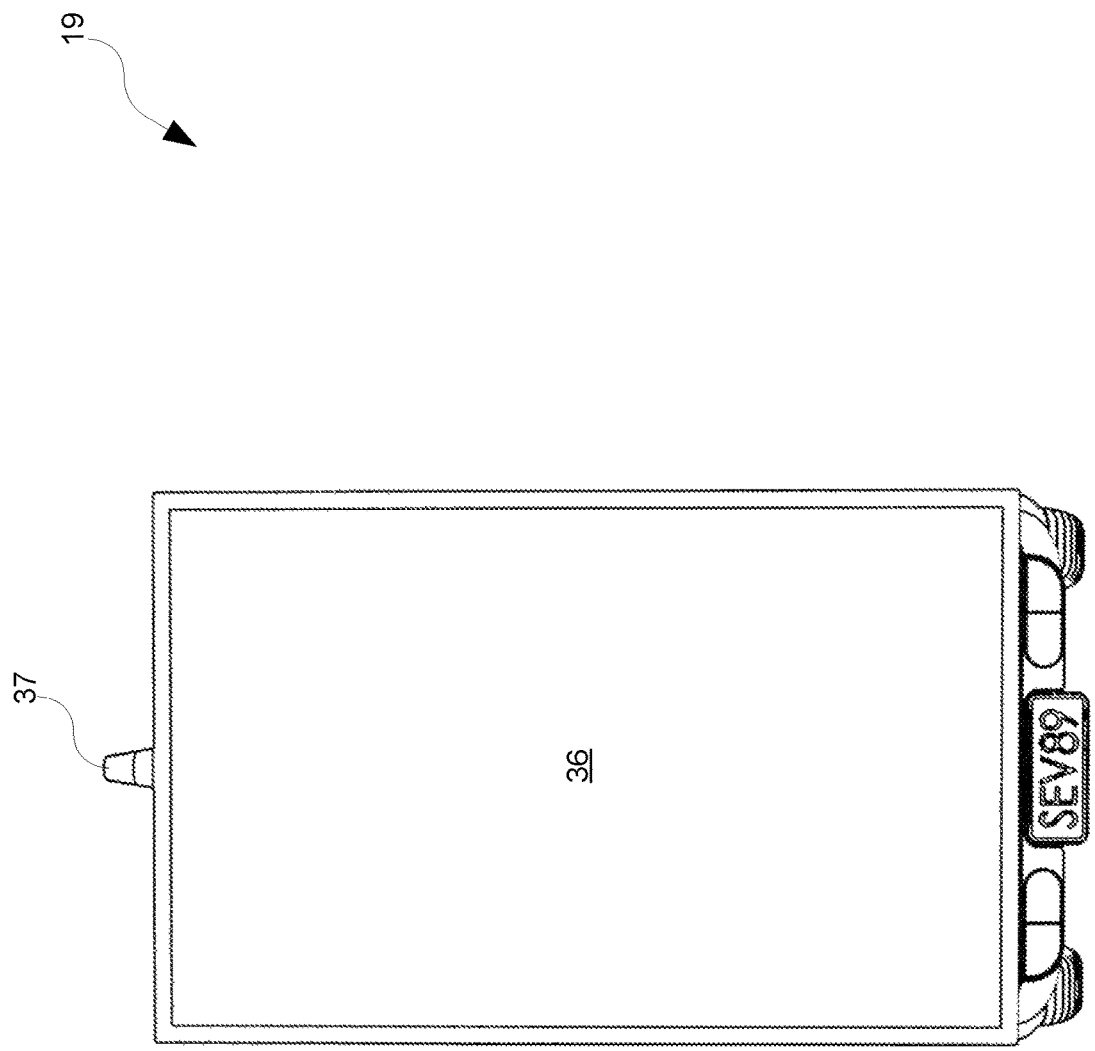
FIG. 16 shows a rear elevation view of the unmanned vehicle.

Specifically, FIGS. 15 and 16 show rear views of the unmanned vehicle 19 wherein, as can be seen, the signage 19 comprises a rearwardly facing large signage board 36 which, in a preferred embodiment is an electronic signage board so as to be able to display dynamic road signage information depending on the required application. As can be seen, the signage board 36 is large, occupying substantially the entire width of the vehicular body and having a greater height than width so as to maximise the signage area.

A hazard light 37 may be provided atop the signage 13.

Furthermore, the signage 36 extends substantially towards the lower extent of the chassis of the unmanned vehicle 19 such that the signage board 36 is not obscured from view by the body of the unmanned vehicle 19.

As such, the signage board 36 is well-suited for road signage applications requiring large roadside signage so as to, for example, be adequately visible by motorists while far off or travelling at high speed.

The location of the rear signage board 36 may lie atop a rear bumper of the unmanned vehicle 19 exposing a license plate if required and indicator lights 44. During the operation of the unmanned vehicle 19, whether in autonomous, semi-autonomous or remote control modes, the indicator lights 44 may display appropriate indications such as illuminating brake, reversing and indicator lights depending on the manoeuvres being performed by the unmanned vehicle 19.

Furthermore, the low-profile vehicular body of the unmanned vehicle 19 provides suitable support for the large rear signage board 36 so as to substantially prevent the signage for 36 from being blown over in high winds or buffeted by passing vehicles.

In a further preferred embodiment, the unmanned vehicle 19 may comprise a forward facing electronic signage board 35 in the location shown. As can be seen, the forward electronic signage board 35 is smaller than that of the rear signage board 36 yet while is suitably elevated so as to be able to display signage for oncoming motorists.

In embodiment, the signage boards 35, 36 may be detachable so as to assist in the transportation of the unmanned vehicle 19 so as to, for example, allow the unmanned vehicle 19 to be transported to site by trailer. In this regard, the signage boards 35, 36 may comprise appropriate mechanical and electrical connections so as to allow for the selective attachment of the signage boards 35, 36 as needs be. In further embodiments, and whereas the vehicular body of the unmanned vehicle 19 is shown comprising a raised rearward aspect, in embodiments, the signage boards 35, 36 may be pivotally coupled to the vehicular body so as to be able to lie flat across the upper surface of the vehicular body for stowage.

Figure 13:
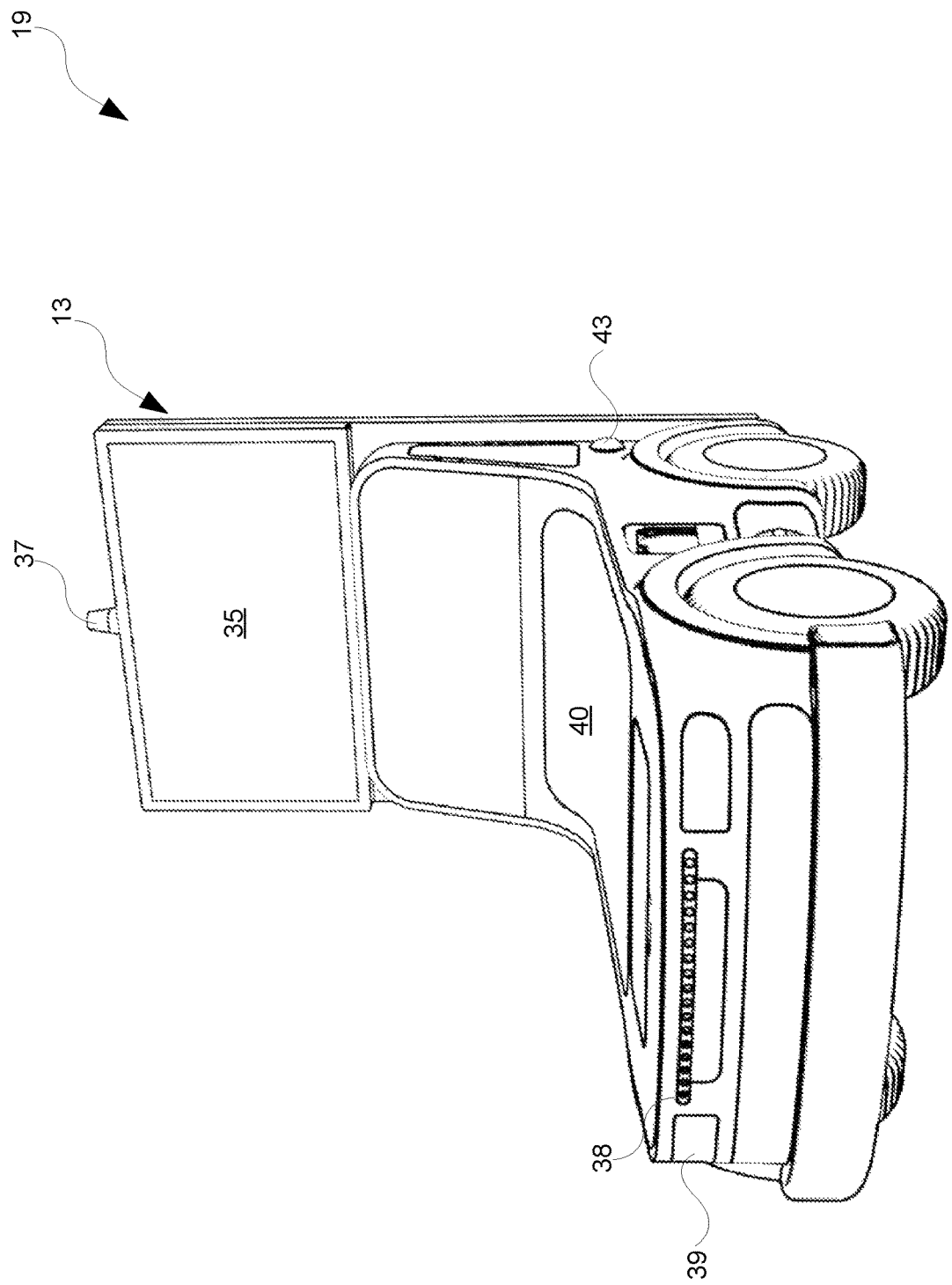
FIG. 13 shows a front perspective view of an examplary physical embodiment of an unmanned vehicle.

Referring to FIG. 13, the front of the unmanned vehicle 19 may comprise a strip of sensors 38 such as those relating to the aforedescribed vision sensors subsystem 15 or other proximity sensors subsystem. Furthermore, the front of the unmanned vehicle 19 may comprise headlights 39 and/or indicator lights.

In embodiments, the upper surface of the unmanned vehicle 19 may be provided with a solar panel 40 battery recharging purposes.

Figure 14:
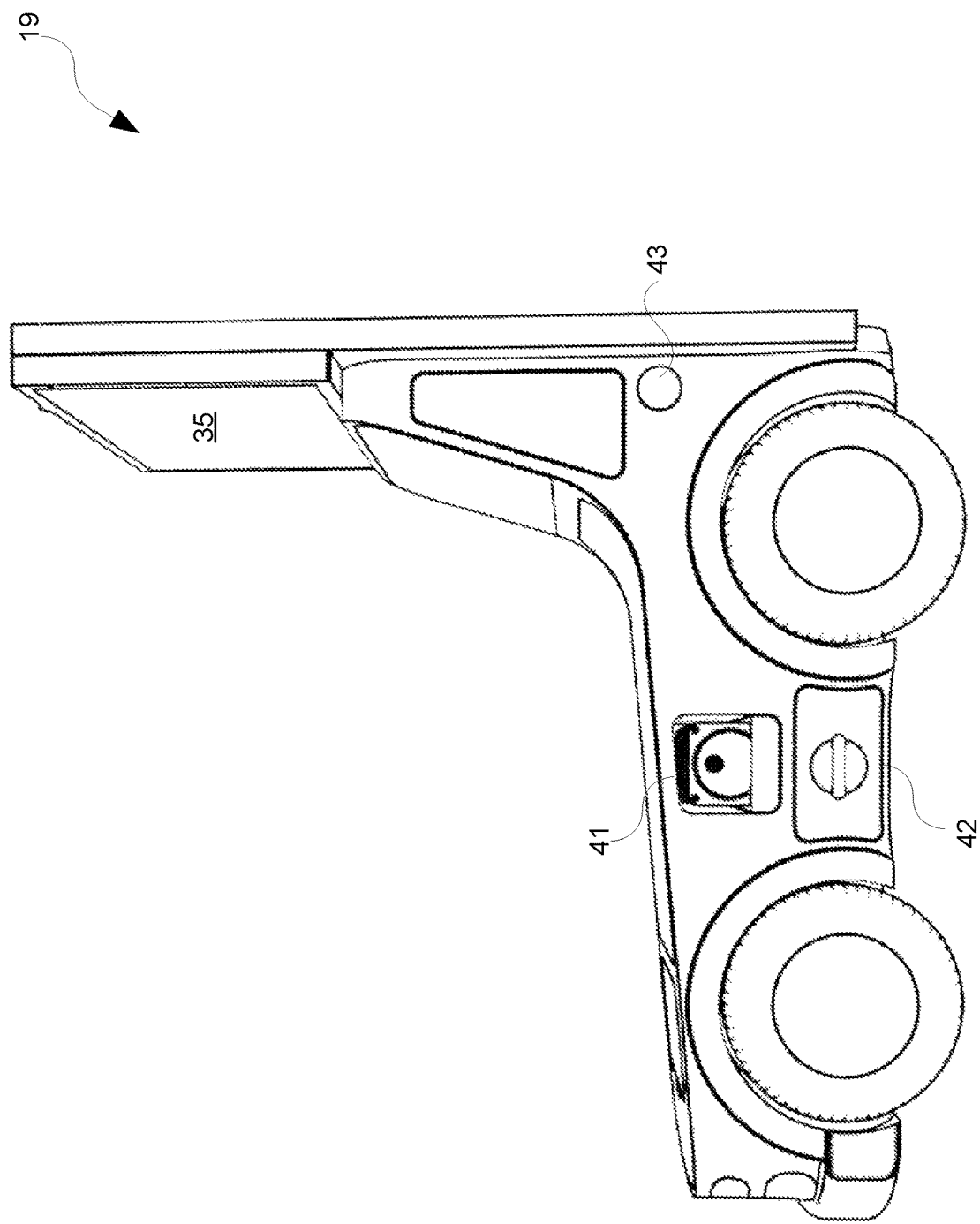
FIG. 14 shows a side perspective view of the unmanned vehicle.

FIG. 14 shows a side view of the unmanned vehicle 19 wherein, in embodiments, a number of ports are provided such as wherein the unmanned vehicle 19 comprises a battery port 42 allowing for the interchange of electronic batteries such as when required for recharging. Alternatively, the Porter 42 may be configured for storing fire retardant or the like wherein the unmanned vehicle 19 is utilised for fire suppression in the manner described above.

Further ports 41 may be provided for electrical componentry such as for sensors subsystems, such as side facing proximity sensor and/or image capture devices.

Furthermore, the unmanned vehicle 19 may further comprise side facing sensors 43 and/or indicator lights 43.

Remote Control Operational Mode

In a particular embodiment, and whereas the aforedescribed embodiments have comprised autonomous and semiautonomous modes of operations, the unmanned vehicle 19 may be operated in a remote control operational mode. Specifically, and as alluded to above, certain roadside situations are hazardous exposing roadside personnel to safety hazards including being struck by passing vehicles and the like while performing various maintenance tasks such as deploying roadside signage.

As such, in lieu of manually performing such roadside maintenance, such as placing roadside signage, the unmanned vehicle 19 in remote control mode may be remotely controlled by the operator accordingly.

In this particularly embodiment, the remotely controlled unmanned vehicle 19 may take the physical embodiment as a substantially shown in FIGS. 13-16. As such, for example, for emergency personnel attending a roadside accident, the unmanned vehicle 19 may be brought on site by trailer and then unloaded for deployment. For example, for a vehicle crash on a highway, a police vehicle, ambulance or the like may attend the scene of the accident wherein the police vehicle tows a trailer comprising one or more of the remotely controllable unmanned vehicles 19. Then, so as to secure the scene, the unmanned vehicle 19 would be unloaded from the trailer, such as by being driven from a ramp.

Thereafter, the unmanned vehicle 19 may be manoeuvred to an appropriate deployment point and appropriate signage displayed so as to secure the scene of the accident. For example, a first responder policeman may deploy the unmanned vehicle 19 500 m down the highway in advance of the accident so as to warn motorists accordingly. In this regard, by utilising the remotely controllable unmanned vehicle 19, the policeman need not manually deploy roadside signage, thereby reducing the risk of being struck by vehicles travelling at speed.

The policeman may be provided with an appropriate remote control for remotely controlling the unmanned vehicle 19.

The remote control may allow the operator to control the drive and steering of the wheels so as to be able to control, for example, left and right hand turns, forward and backward manoeuvres. When controlling the unmanned vehicle 19 in such a manner, the indicator lights 44 may be controlled automatically such that, when, for example, when reversing the unmanned vehicle 19 down the highway, the reverse lights and or hazard lights 44 are illuminated appropriately.

In embodiments, the remote control may comprise a digital display for displaying information relevant to the location of the vehicle 19 so as to allow the operator to appropriately locate the vehicle 19. For example, in one embodiment, the vehicle 19 may comprise at least one videocamera so as to allow the operator to view a substantial real-time video data from the remote control such that, when, for example, when reversing the vehicle 19 down the highway, the operator need not necessarily keep sight of the vehicle in lieu of rather focusing on the digital display of the remote control so as to, for example, ensure that the vehicle 19 stays within the lane.

In further embodiments, a map representation may be displayed by the remote control representing the respective geographic locations of the operator and the vehicle 19. Such a representation may be augmented with map data such as that which may be retrieved from a GIS server such as Google Maps or the like. As such, for a bend in a highway, the map representation would show such a bend retrieved from Google Maps and show the respective locations of the operator and the unmanned vehicle 19 so as to further allow for the appropriate location of the unmanned vehicle 19.

In embodiments, the remote control may be utilised for controlling the signage also. For example, for the illustrative example of the highway accident, the operator may choose appropriate signage representing, for example, "accident ahead". In further embodiments, the operator may dynamically control the signage displayed, such as by representing "accident 400 m ahead".

In embodiments, the sign displayed by the signage board 36 may be dynamically updated by the unmanned vehicle 19 wherein, for example, as the unmanned vehicle 19 travels down the highway, the unmanned vehicle 19 measures the distance so as to be able to dynamically display the distance on the signage board wherein, for example, when the vehicle 19 is 50 m away from the operator the signage board 36 may represent "Accident 50 m ahead" whereas, when 150 m away from the operator, the signage board 36 may represent "Accident 150 m ahead" and so on and so forth.

In embodiments, the unmanned vehicle 19 may comprise a controller comprising a memory comprising signage data representing a plurality of roadside signs. As such, the signage displayed by the signboard 36 may be retrieved from the memory device. In alternative embodiments, the signage data for display by the signboard 36 may be conveyed to the unmanned vehicle 19 across the data interface.

In one embodiment, the remote control may comprise a software application executing on a mobile communication device such as a smartphone device or the like. In this manner, the software application would be downloaded to the mobile communication device so as to allow the mobile communication device to control the functionality of the unmanned vehicle 19. For example, the operator may download a software application to an Apple iPhone device or the like wherein the Apple iPhone comprises the requisite digital display, data connectivity and user interface functionality. For data connectivity, the mobile communication device may communicate across the cellular data network via a server. Alternatively, the mobile communication device may communicate directly with the unmanned vehicle 19 such as by utilising Bluetooth, range permitting or alternatively utilising longer range Wi-Fi or Wi-Fi direct. In further embodiments, longer range RF may be utilised wherein an RF interface is plugged into the mobile communication device, such as via the USB port, so as to allow for longer range direct communication, such as in rural environments.

The user interface displayed by the software application may display the aforedescribed real-time video data captured by the videocameras of the unmanned vehicle 19, the map representation showing the relative offsets of the unmanned vehicle 19 from the operator and other control information such as allowing the operator to control the drive and direction of the unmanned vehicle 19 and also the electronic signage displayed, including the dynamic configuration of the electronic signage displayed.

It should be noted that differing aspects of the unmanned vehicle 19 may be remotely controlled such as wherein, for example, the unmanned vehicle 19 is substantially entirely remote-controlled wherein, for example, the operator may control all of the drive, steering and signage of the unmanned vehicle 19.

However, in alternative embodiments, the unmanned vehicle 19 may be at least semiautonomous wherein, for example, when attending the accident scene, the operator may control the unmanned vehicle with an instruction that an accident has occurred and that the unmanned vehicle 19 should deploy 500 m down the highway to warn motorists. As such, the unmanned vehicle 19 would then drive from the trailer automatically and continue down the road navigating in a particular lane appropriately or adjacent the roadside verge such as by utilising the vision sensor subsystem or other location sensing subsystems until such time that the unmanned vehicle 19 is appropriately deployed.

Thereafter, once the accident has been cleared, the unmanned vehicle 19 may be recalled to the trailer wherein, again, the unmanned vehicle 19 navigate substantially autonomously back to the trailer for retrieval.

Interpretation

Wireless

The invention may be embodied using devices conforming to other network standards and for other applications, including, for example other WLAN standards and other wireless standards. Applications that can be accommodated include IEEE 802.11 wireless LANs and links, and wireless Ethernet.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Additional Embodiments

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

Carrier Medium

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function

Furthermore, some of the embodiments are described herein as a method or combination of elements of a method that can be implemented by a processor of a processor device, computer system, or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

The invention claimed is:

1. A system for autonomous beyond line-of-sight roadside maintenance machinery signage, the system comprising:
   a maintenance machine comprising:
   a maintenance machine location sensor configured for determining a location of the maintenance machine;
   at least one autonomous unmanned vehicle comprising:
   drive motors operably coupled to driven wheels;
   steering coupled to the driven wheels;
   an unmanned vehicle location sensor configured for determining a location of the autonomous unmanned vehicle;
   a vision sensor subsystem for determining at least a lateral offset of the autonomous unmanned vehicle with respect to a road verge;
   wherein, in use, the system is configured for:
   receiving unmanned vehicle formation configuration settings for controlling a formation deployment of the unmanned vehicle with respect to the maintenance machine, the formation configuration settings comprising at least one of:
   a route offset configuration setting representing a distance between the unmanned vehicle and the maintenance machine in use; and
   a road verge lateral offset configuration setting representing an offset distance of the unmanned vehicle from a road verge in use; receiving maintenance machine location data from the maintenance machine location sensor representing a location of the maintenance machine;
   receiving unmanned vehicle location data from the unmanned vehicle location sensor representing a location of the unmanned vehicle;
   controlling the motors of the unmanned vehicle in accordance with the route offset configuration setting, maintenance machine location data and unmanned vehicle location data;
   receiving realtime road verge lateral offset data from the vision sensor subsystem representing a realtime road verge lateral offset of the unmanned vehicle from the road verge; and
   controlling the steering in accordance with the realtime road verge lateral offset data and the road verge lateral offset configuration setting,
   wherein the at least one autonomous unmanned vehicle comprises a stop/go signage and wherein the system is configured for implementing a single lane alternate traffic flow control using the stop/go signage of the at least one autonomous unmanned vehicle and another unmanned vehicle; and
   the system is configured for driving the drive motors when the stop/go signage displays go signage.

2. The system as claimed in claim 1, wherein the system is configured for controlling the drive motors of the at least one autonomous unmanned vehicle further in accordance with an actual route, wherein the route offset configuration setting is a leading route offset configuration setting such that the at least one autonomous unmanned vehicle is configured for leading the maintenance machine and wherein the actual route is a predetermined route.

3. The system as claimed in claim 1, wherein the route offset configuration setting is a following route offset configuration setting such that the at least one autonomous unmanned vehicle is configured for following the maintenance machine and wherein the actual route is a waypoint route of the maintenance machine and wherein the system is configured for creating the waypoint route of the maintenance machine in accordance with periodic location data received from the maintenance machine location sensor.

4. The system as claimed in claim 1, wherein the system is configured for controlling the steering of the at least one autonomous unmanned vehicle further in accordance with an actual route, the route offset configuration setting is a following route offset configuration setting such that the at least one autonomous unmanned vehicle is configured for following the maintenance machine and wherein the actual route is a waypoint route of the maintenance machine.

5. The system as claimed in claim 4, wherein the system is configured for generating an interpolated unmanned vehicle route in accordance with the waypoint route and wherein generating the interpolated unmanned vehicle route comprises identifying portions of the waypoint route where the maintenance machine reverses to avoid an obstacle.

6. The system as claimed in claim 1, wherein the vision sensor subsystem is configured for determining an actual lateral offset of the at least one autonomous unmanned vehicle with respect to the road verge using image recognition and wherein the image recognition is configured for recognising at least one of a verge line, centre line, and roadside barrier and wherein the vision sensor subsystem is configured for interpolating between broken sections of the centre line.

7. The system as claimed in claim 1, wherein the at least one autonomous unmanned vehicle further comprises object avoidance capabilities and wherein the object avoidance capabilities comprises an image subsystem using image recognition and wherein the image recognition comprises recognising known roadside furniture.

8. The system as claimed in claim 7, wherein the object avoidance capabilities of the at least one autonomous unmanned vehicle comprises an object detector.

9. A system as claimed in claim 1, wherein the system is configured for selecting the unmanned vehicle formation configuration settings in accordance with a maintenance plan selection, wherein the maintenance machine comprises a graphical user interface (GUI) configured for selecting the maintenance plan selection and wherein the maintenance machine comprises the GUI configured for configuration the unmanned vehicle formation configuration settings.

10. The system as claimed in claim 1, wherein the at least one autonomous unmanned vehicle further comprises dynamic signage and the system is configured for controlling the dynamic signage and wherein the system is configured for updating the dynamic signage in accordance with a maintenance mode of operation of the maintenance machine.

11. The system as claimed in claim 10, wherein the system is configured for updating the dynamic signage in accordance with a route offset distance representing a distance between the at least one autonomous unmanned vehicle and the maintenance machine.

12. The system as claimed in claim 1, wherein the at least one autonomous unmanned vehicle comprises a passing car counter and wherein the system is further configured for controlling traffic flow in accordance with count data received from the passing car counter.

13. The system as claimed in claim 1, wherein the system is configured for halting the drive motors of the at least one autonomous unmanned vehicle when the stop/go signage displays a stop signage.

\* \* \* \* \*